United States Patent
Ikuta et al.

(10) Patent No.: US 9,387,577 B2
(45) Date of Patent: Jul. 12, 2016

(54) POWER TOOL

(75) Inventors: Hiroki Ikuta, Anjo (JP); Takamasa Hanai, Anjo (JP); Akihiro Ito, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 606 days.

(21) Appl. No.: 13/333,255

(22) Filed: Dec. 21, 2011

(65) Prior Publication Data
US 2012/0160535 A1    Jun. 28, 2012

(30) Foreign Application Priority Data

Dec. 27, 2010   (JP) ................. 2010-290451

(51) Int. Cl.
| B23Q 5/00 | (2006.01) |
| B25F 5/00 | (2006.01) |
| B25B 21/00 | (2006.01) |
| B25B 23/00 | (2006.01) |
| F16H 13/08 | (2006.01) |

(52) U.S. Cl.
CPC ............... B25F 5/001 (2013.01); B25B 21/00 (2013.01); B25B 23/0064 (2013.01); F16H 13/08 (2013.01)

(58) Field of Classification Search
CPC ......... B25F 5/001; B25B 21/00; B25B 17/00; B25B 17/02; B25D 2216/0023
USPC ...................... 173/5, 176, 178, 181, 216–217
See application file for complete search history.

(56) References Cited

U.S. PATENT DOCUMENTS

| 1,679,155 A | 7/1926 | Connell |
| 3,244,026 A | 4/1966 | De Kay |
| 3,433,099 A | 3/1969 | Nasvytis |
| 3,656,357 A * | 4/1972 | Corwin ................ B21D 39/10 74/25 |
| 4,199,031 A * | 4/1980 | van der Lely ........ A01B 33/106 172/271 |
| 4,222,445 A * | 9/1980 | Vadetsky ............... E21B 4/003 175/106 |
| 4,305,597 A * | 12/1981 | McCarty ........................ 279/22 |
| 4,892,013 A * | 1/1990 | Satoh ............................ 475/266 |

(Continued)

FOREIGN PATENT DOCUMENTS

| EP | 1 946 895 A1 | 7/2008 |
| JP | A-59-6456 | 1/1984 |

(Continued)

OTHER PUBLICATIONS

May 29, 2014 Office Action issued in Japanese Patent Application No. 2010-290451.

(Continued)

*Primary Examiner* — Robert Long
(74) *Attorney, Agent, or Firm* — Oliff PLC

(57) ABSTRACT

A power tool having a gear speed reducing mechanism which is free of backlash and a planetary gear speed reducing mechanism. The planetary gear speed reducing mechanism has a driving-side member that is rotationally driven by a prime mover, a driven-side member which is rotatably and coaxially disposed with the driving-side member and to which a tool bit is coupled, and an intervening member which is disposed between the driving-side member and the driven-side member. The intervening member is configured as a planetary member and at least caused to rotate by frictional force acting on its contact surface in contact with the driving-side member when the driving-side member is rotationally driven, so that torque of the driving-side member is transmitted to the driven-side member at reduced speed.

4 Claims, 15 Drawing Sheets

(56) References Cited

U.S. PATENT DOCUMENTS

| | | | |
|---|---|---|---|
| 4,950,110 A | | 8/1990 | Suzuki |
| 5,029,461 A | * | 7/1991 | Lawrence ............... B21B 31/07 384/556 |
| 5,096,157 A | * | 3/1992 | Yasuda ................... F02C 7/232 137/625.65 |
| 5,439,086 A | * | 8/1995 | Withey ..................... F16D 7/08 192/108 |
| 5,607,266 A | * | 3/1997 | Anderson ..................... 408/124 |
| 5,711,739 A | * | 1/1998 | Hashimoto ............ B23Q 5/048 475/254 |
| 5,993,454 A | * | 11/1999 | Longo ................. A61B 17/1624 606/80 |
| 6,063,001 A | * | 5/2000 | Suhling ................ E21B 43/121 417/410.3 |
| 6,462,447 B1 | * | 10/2002 | Baker ................... F16H 19/025 310/103 |
| RE37,905 E | * | 11/2002 | Bourner et al. ................ 173/48 |
| 7,101,300 B2 | * | 9/2006 | Milbourne et al. ........... 475/265 |
| 7,712,546 B2 | * | 5/2010 | Tokunaga ..................... 173/156 |
| 8,047,057 B2 | * | 11/2011 | Chen ................................ 73/48 |
| 9,211,639 B2 | * | 12/2015 | Hecht ................... B25D 11/062 |
| 2004/0026129 A1 | * | 2/2004 | Downie ................. E21B 4/006 175/106 |
| 2004/0222600 A1 | * | 11/2004 | Jacobs ................. B23B 31/201 279/48 |
| 2006/0211534 A1 | * | 9/2006 | Roberts ................... B25B 21/00 475/317 |
| 2007/0072727 A1 | * | 3/2007 | Nohara .................... F16C 3/08 475/178 |
| 2008/0217037 A1 | * | 9/2008 | Howell .................. E21B 7/022 173/28 |
| 2010/0032179 A1 | * | 2/2010 | Hanspers et al. ............... 173/11 |
| 2010/0163261 A1 | * | 7/2010 | Tomayko ............. B23B 45/008 173/47 |
| 2010/0326687 A1 | * | 12/2010 | Roehm et al. ................... 173/48 |
| 2011/0100715 A1 | * | 5/2011 | Kolle ..................... E21B 4/006 175/71 |
| 2011/0127059 A1 | * | 6/2011 | Limberg et al. ............... 173/216 |
| 2012/0074658 A1 | * | 3/2012 | Puzio et al. ..................... 279/134 |
| 2013/0000938 A1 | * | 1/2013 | Matsunaga et al. .......... 173/181 |
| 2013/0025901 A1 | * | 1/2013 | Shi et al. ........................ 173/216 |
| 2014/0069675 A1 | * | 3/2014 | Zhang et al. .................. 173/178 |

FOREIGN PATENT DOCUMENTS

| | | |
|---|---|---|
| JP | A-09-201004 | 7/1997 |
| JP | A-2008-173739 | 7/2008 |
| WO | WO 2011109930 A1 * | 9/2011 |

OTHER PUBLICATIONS

Sep. 17, 2014 Office Action issued in Japanese Patent Application No. 2010-290451 (with English translation).

Jan. 13, 2015 Search Report issued in European Patent Application No. 11195474.9.

* cited by examiner

POWER TOOL

BACKGROUND OF THE INVENTION

1. Field of the Invention

The present invention relates to a power tool that performs a predetermined operation by driving a tool bit.

2. Description of the Related Art

Japanese laid-open patent publication No. 2008-173739 discloses a screw tightening machine having a power transmitting mechanism in the form of a planetary gear mechanism that transmits torque of a motor to a tool bit at reduced speed. Such a screw tightening machine having a planetary gear mechanism is advantageous, for example, in that a large speed reduction ratio and a strong screw-tightening force can be obtained and in that an input shaft and an output shaft can be coaxially disposed.

In the gear type speed reducing mechanism, however, backlash is inevitable and causes noise, which is particularly remarkable in a speed reducer which rotates at high speed.

SUMMARY OF THE INVENTION

Accordingly, it is an object of the present invention to provide a power tool having a gear speed reducing mechanism which is free of backlash.

In order to solve the above-described problem, according to a preferred embodiment of the present invention, a power tool is provided which performs a predetermined operation on a workpiece by driving a tool bit. The power tool of the present invention has a prime mover that drives the tool bit and a planetary gear speed reducing mechanism that transmits torque of the prime mover to the tool bit. The planetary gear speed reducing mechanism has a driving-side member which is rotationally driven by the prime mover, a driven-side member which is rotatably and coaxially disposed with the driving-side member and to which the tool bit is coupled, and an intervening member which is disposed between the driving-side member and the driven-side member. Further, the intervening member is configured as a planetary member and at least caused to rotate by frictional force acting on its contact surface in contact with the driving-side member when the driving-side member is rotationally driven, so that torque of the driving-side member is transmitted to the driven-side member at reduced speed. The "predetermined operation" in the present invention widely includes a screw tightening operation by rotationally driving a tool bit in the form of a driver bit, a grinding/polishing operation by rotation or eccentric rotation of a grinding wheel or an abrasive, a cutting operation on a workpiece by rotationally driving a saw blade, and other similar operations.

In the planetary gear speed reducing mechanism of the present invention, the torque of the driving-side member is transmitted to the driven-side member by frictional force. With such a construction, backlash which is inevitable in a gear type speed reducing mechanism can be eliminated, so that noise which is caused when the planetary gear speed reducing mechanism is driven can be reduced. Further, with the construction in which the torque transmission is made by frictional force, the planetary gear speed reducing mechanism can have a simpler shape and thus can be easier to manufacture when compared with the known planetary gear mechanism.

According to a further aspect of the present invention, a tapered portion is provided between the driving-side member and the driven-side member and inclined with respect to a rotation axis of the driving-side member. Further, the intervening member is held in frictional contact with the tapered portion, and a pressing force is applied between the intervening member and the tapered portion under loaded conditions. The "loaded conditions" in this embodiment refer to the conditions in which torque transmission from the driving-side member to the driven-side member is allowed, or in which torque of the driving-side member can be transmitted to the driven-side member.

According to this aspect, with the construction in which the torque of the driving-side member is transmitted to the driven-side member by frictional force which is caused by pressing the intervening member against the tapered portion, the pressing force with which the intervening member is pressed against the tapered portion in a direction of the rotation axis is amplified to a force in a radial direction transverse to the direction of the rotation axis by the wedging effect, so that higher frictional force can be obtained and thus the power transmitting performance can be enhanced. In order to generate the radial force to which the force in the direction of the rotation axis is amplified, in the tapered portion by utilizing the wedging effect, the inclination angle of the tapered portion with respect to the direction of the rotation axis is preferably set to an angle above zero and below 45 degrees, and more preferably to 20 degrees or below.

According to a further aspect of the present invention, under unloaded conditions, a predetermined preload is constantly applied between the intervening member and the tapered portion. Further, the "preload" in this embodiment is typically obtained by acting an elastic force of an elastic member.

According to this aspect, with the construction in which the preload is constantly applied under unloaded conditions, the intervening member can be reliably held in contact with the tapered portion.

According to a further aspect of the present invention, when the driving-side member and the driven-side member are rotationally driven, in addition to the predetermined preload, a pressing force is further applied between the intervening member and the tapered portion. Further, the "pressing force" in this embodiment is typically obtained by displacing the intervening member and the tapered portion in the pressure direction with respect to each other according to load (rotational resistance) caused in a torque transmission path from the driving-side member to the driven-side member.

According to this aspect, the pressing force is further applied between the tapered portion and the intervening member, so that the frictional force on the contact surface between the tapered portion and the intervening member can be increased and the power transmitting performance can be further enhanced.

According to a further aspect of the present invention, the planetary gear speed reducing mechanism has a carrier for holding the intervening member in the form of the planetary member, and the driven-side member comprises the carrier and receives power transmission from the planetary member.

According to this aspect, the driven-side member is formed by the carrier, so that the driven-side member can be rotationally driven at the revolution speed of the intervening member.

According to the present invention, a power tool having a gear speed reducing mechanism which is free of backlash is provided. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Embodiment of the Invention

Figure 1:
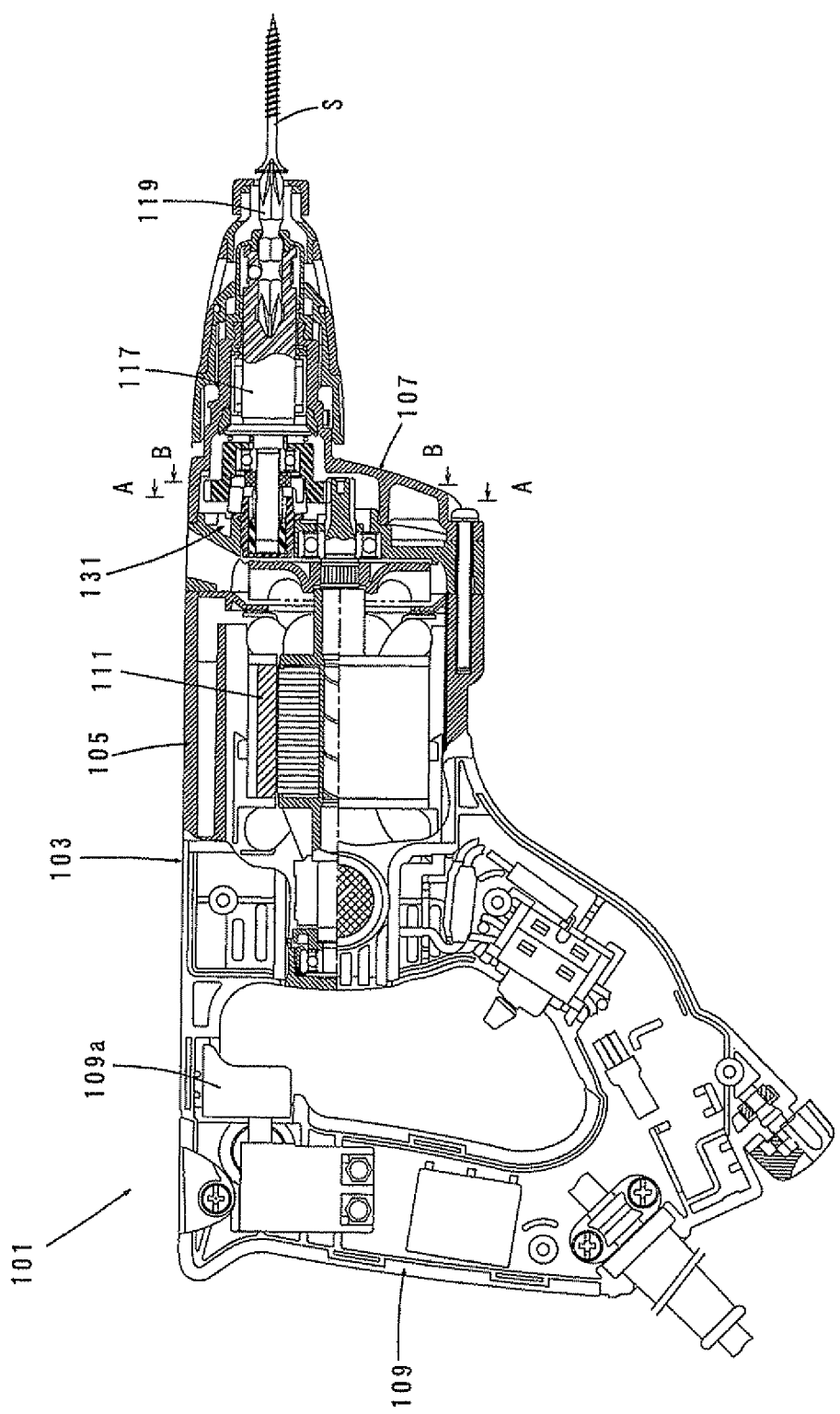
FIG. 1 is a sectional side view showing an entire screwdriver according to a first embodiment of the invention.

An embodiment of the present invention is now described with reference to FIGS. 1 to 7. FIG. 1 shows an entire electric screwdriver 101 as a representative embodiment of the power tool according to the present invention. The screwdriver 101 according to this embodiment mainly includes a power tool body in the form of a body 103, a driver bit 119 detachably coupled to a front end region (right end region as viewed in FIG. 1) of the body 103 via a spindle 117, and a handgrip 109 connected to the body 103 on the side opposite to the driver bit 119. The driver bit 119 is a feature that corresponds to the "tool bit" according to the present invention. Further, in this embodiment, for the sake of convenience of explanation, the side of the driver bit 119 is taken as the front and the side of the handgrip 109 as the rear.

The body 103 mainly includes a motor housing 105 that houses a driving motor 111, and a gear housing 107 that houses a power transmitting mechanism 131. The driving motor 111 is driven when a trigger 109a on the handgrip 109 is depressed, and stopped when the trigger 109a is released. The driving motor 111 is a feature that corresponds to the "prime mover" according to the present invention.

Figure 3:
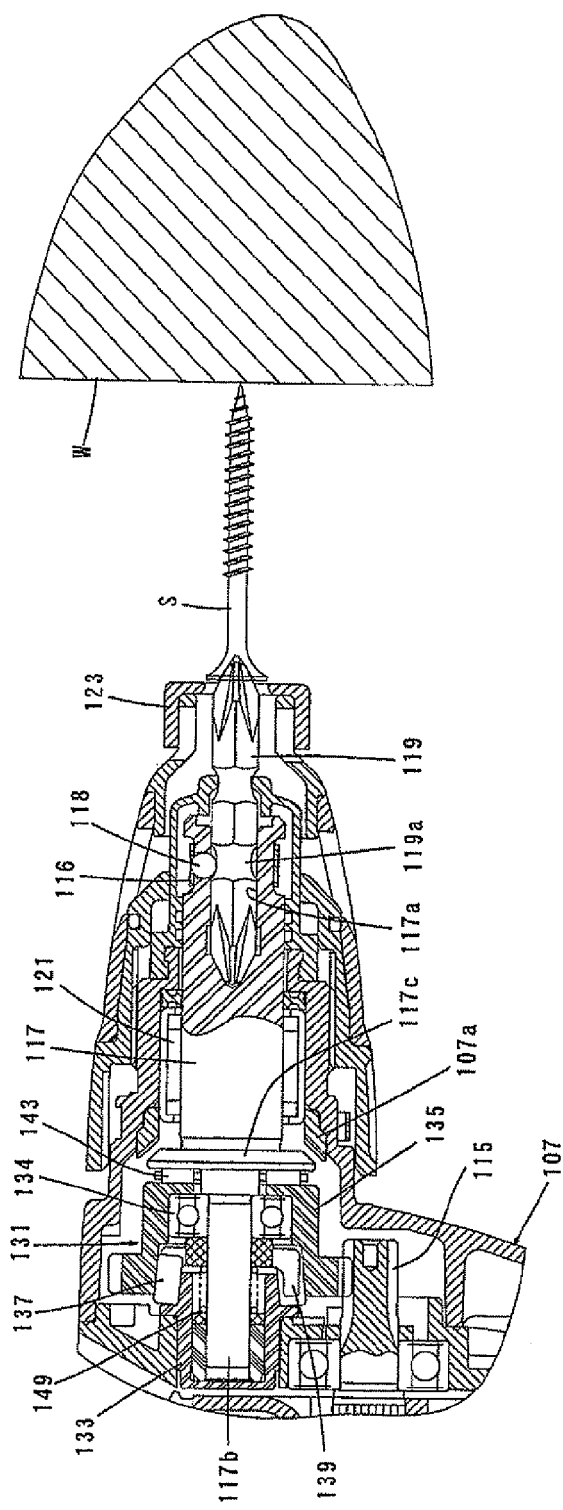
FIG. 3 is an enlarged view of an essential part of FIG. 1, in a state of the beginning of a screw tightening operation (a power transmission state in which a spindle is pushed toward a body together with a driver bit and torque of a driving gear is transmitted to the spindle).

As shown in FIG. 3, the spindle 117 is mounted to the gear housing 107 via a bearing 121 such that it can move in its longitudinal direction with respect to the gear housing 107 and can rotate around its axis. The spindle 117 has a bit insertion hole 117a on its tip end portion (front end portion). The driver bit 119 having a small-diameter portion 119a is inserted into the bit insertion hole 117a, and a steel ball 118 is biased by a ring-like leaf spring 116 and engaged with the small-diameter portion 119a. In this manner, the spindle 117 detachably holds the driver bit 119.

Figure 2:
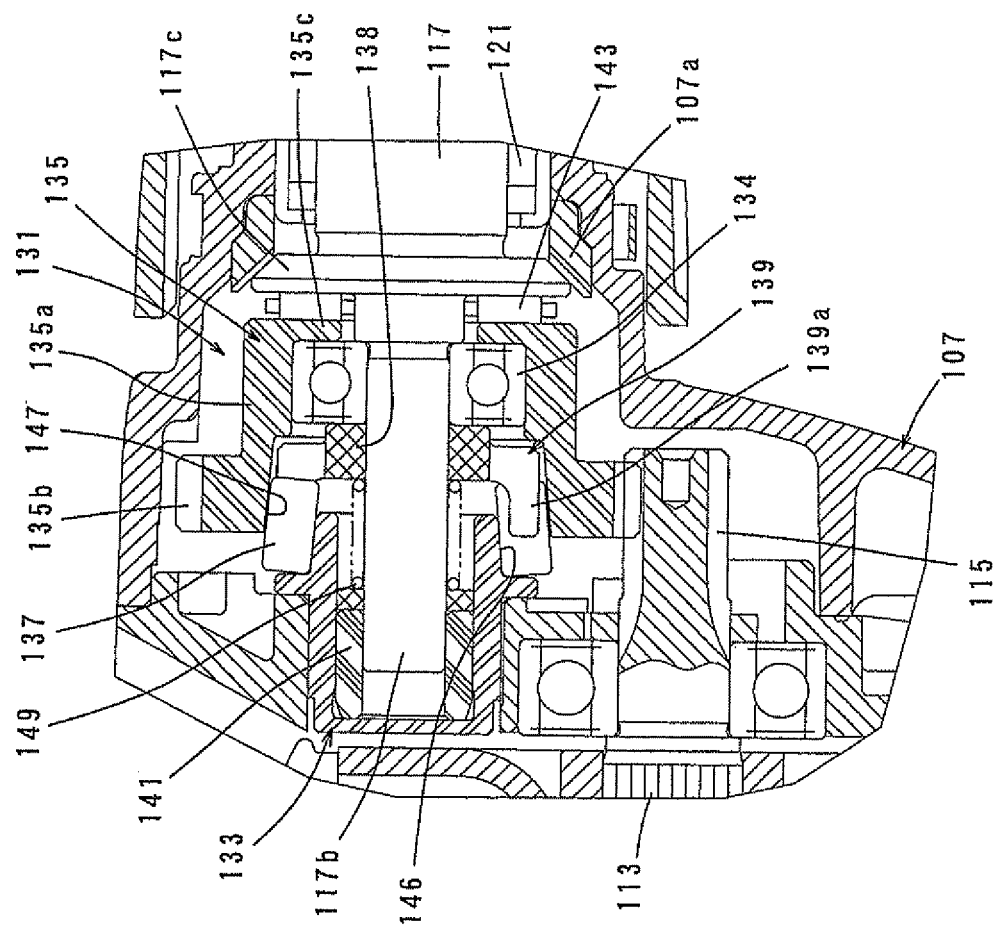
FIG. 2 is an enlarged view of an essential part of FIG. 1, in an initial state.

As shown in FIG. 2, the power transmitting mechanism 131 for transmitting rotating output of the driving motor 111 to the spindle 117 mainly includes a planetary gear speed reducing mechanism of a planetary roller type. The power transmitting mechanism 131 is a feature that corresponds to the "planetary gear speed reducing mechanism" according to the present invention and its construction is shown in FIG. 2. The power transmitting mechanism 131 mainly includes a fixed hub 133, a driving gear 135, a plurality of columnar rollers 137 disposed between the fixed hub 133 and the driving gear 135, and a roller holding member 139 for holding the rollers 137.

The fixed hub 133 corresponds to a sun member of the planetary gear speed reducing mechanism, and is disposed rearward of the spindle 117 and fixed to the gear housing 107. The driving gear 135 corresponds to an outer ring member of the planetary gear speed reducing mechanism and is disposed forward of the fixed hub 133. Further, the driving gear 135 is mounted to a rear portion of the spindle 117 via a bearing (radial ball bearing) 134 such that it is allowed to rotate with respect to the spindle 117 and prevented from moving in the longitudinal direction with respect to the spindle. The columnar rollers 137 correspond to a planetary member of the planetary gear speed reducing mechanism and are disposed between an inner circumferential surface of the driving gear 135 and an outer circumferential surface of the fixed hub 133. The roller holding member 139 corresponds to a carrier of the planetary gear speed reducing mechanism, and holds the rollers 137 such that the rollers can rotate. Further, the roller holding member 139 is fixed to the spindle 117 and rotates together with the spindle 117. The driving gear 135, the rollers 137 and the roller holding member 139 are features that correspond to the "driving-side member", the "intervening member" and the "driven-side member", respectively, according to the present invention.

The driving gear 135 has a generally cup-like form and has teeth 135b formed in an outer periphery of an open end portion of a barrel part 135a which forms a circumferential wall of the driving gear 135. The teeth 135b are constantly engaged with a pinion gear 115 formed on a motor shaft 113 of the driving motor 111. Further, a circular through hole is formed in the center of a bottom wall of the driving gear 135. The roller holding member 139 is disposed between the fixed hub 133 and the driving gear 135. The roller holding member 139 has a generally cylindrical shape, and a barrel part 139a forming a circumferential wall of the roller holding member 139 holds the rollers 137 such that the rollers can rotate. Further, a retainer ring 138 is fixedly mounted to one axial end (front end) of the roller holding member 139. The spindle 117 has a small-diameter shank 117b on its one end (rear end) and the small-diameter shank 117b is inserted into a bore of the fixed hub 133 through the through hole of the driving gear 135 and a ring hole of the retainer ring 138 of the roller holding member 139. The small-diameter shank 117b is loosely fitted through the through hole of the driving gear 135 and press-fitted through the ring hole of the retainer ring 138 and supported in the bore of the fixed hub 133 via a bearing (bush) 141 such that it can move in the longitudinal direction. The roller holding member 139 is integrated with the spindle 117 by press-fitting the small-diameter shank 117b of the spindle 117 through the retainer ring 138.

Further, a flange 117c is formed substantially in the middle of the spindle 117 in the longitudinal direction and faces a front surface of a bottom wall 135c of the driving gear 135. Further, a bearing (thrust roller bearing) 143 is disposed between a rear surface of the flange 117c and a front surface of the bottom wall of the driving gear 135 and receives a thrust load. A bearing 134 is disposed inside the driving gear 135 on the rear surface of the bottom wall of the driving gear 135. Thus the driving gear 135 is held between the bearings 134 and 143 from the front and the rear in the axial direction and supported such that it can rotate with respect to the spindle 117 and move together with the spindle 117 in the longitudinal direction. Further, the bearing 134 is prevented from slipping off by a front surface of the retainer ring 138 for the roller holding member 139 fixed to the small-diameter shank 117b of the spindle 117. The fixed hub 133, the driving gear 135, the roller holding member 139 and the spindle 117 are coaxially disposed.

Figure 6:
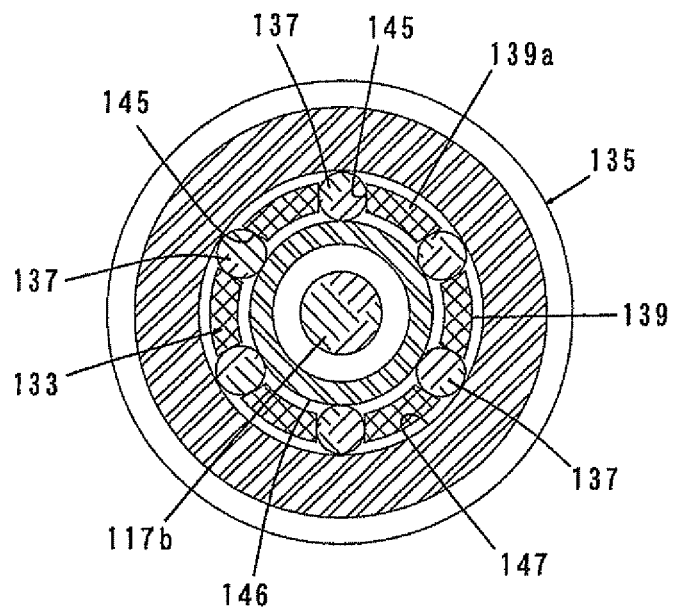
FIG. 6 is a sectional view taken along line A-A in FIG. 1.
Figure 7:
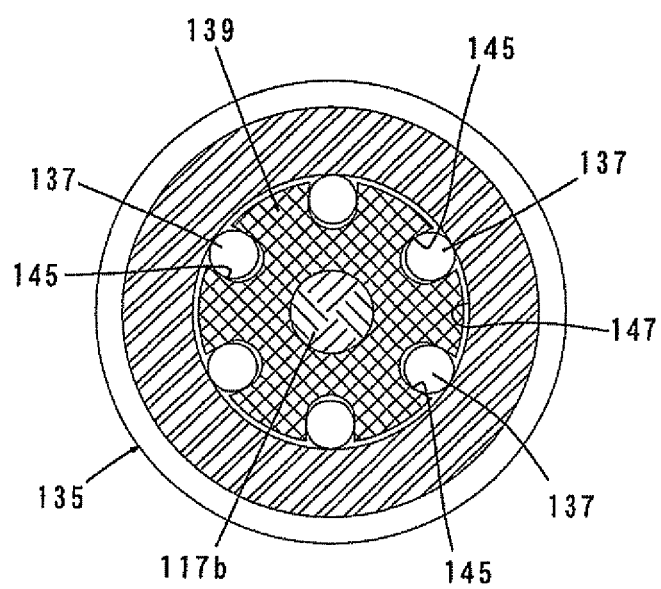
FIG. 7 is a sectional view taken along line B-B in FIG. 1.

As shown in FIGS. 6 and 7, a plurality of axially extending roller installation grooves 145 each having a closed front end are formed in the barrel part 139a of the roller holding member 139 at predetermined (equal) intervals in the circumferential direction. The rollers 137 are loosely fitted in the roller installation grooves 145. Thus, the rollers 137 are held by the roller holding member 139 such that the rollers are allowed to rotate within the roller installation grooves 145 and move in the radial direction of the spindle 117, but they are prevented from moving in the circumferential direction with respect to the spindle 117.

As shown in FIG. 2, the fixed hub 133 and the driving gear 135 are opposed to each other on opposite sides of the roller holding member 139 in the longitudinal direction of the spindle 117. The barrel part 135a of the driving gear 135 has an inner diameter larger than an outer diameter of the fixed hub 133, and a rear end portion of the barrel part 135a is disposed over an outer surface of a front end portion of the fixed hub 133. Thus, the outer circumferential surface of the fixed hub 133 and the inner circumferential surface of the barrel part 135a of the driving gear 135 are opposed to each other in the radial direction transverse to the longitudinal direction of the driving gear 135 (the longitudinal direction of the spindle 117). The outer circumferential surface of the fixed hub 133 and the inner circumferential surface of the barrel part 135a of the driving gear 135 are formed as tapered surfaces (conical surfaces) 146, 147 which are inclined at a predetermined angle with respect to the longitudinal direction (the rotation axis) of the driving gear 135 and extend parallel to each other. The tapered surface 146 of the fixed hub 133 and the tapered surface 147 of the driving gear 135 are features that correspond to the "tapered portion" according to the present invention. The tapered surface 146 of the fixed hub 133 is tapered forward (toward the driver bit), and the tapered surface 147 of the driving gear 135 is also tapered forward.

As shown in FIGS. 2 and 6, the rollers 137 held in the roller installation grooves 145 are disposed between the tapered surface 146 of the fixed hub 133 and the tapered surface 147 of the barrel part 135a of the driving gear 135, and part of the outer surface of each of the rollers 137 protrudes from the inner and outer surfaces of the barrel part 139a of the roller holding member 139. Further, the roller 137 is configured as a parallel roller having parallel opposed surfaces, and placed substantially in parallel to the tapered surfaces 146, 147 when disposed between the tapered surface 146 of the fixed hub 133 and the tapered surface 147 of the driving gear 135. Therefore, when the rollers 137 are moved rearward together with the roller holding member 139 and the driving gear 135 against a biasing force of a compression coil spring 149 which is described below, by pressing the driver bit 119 against the workpiece, the distance between the tapered surface 146 of the fixed hub 133 and the tapered surface 147 of the driving gear 135 is decreased, so that the rollers 137 are pressed against the tapered surfaces 146, 147. Specifically, the rollers 137 serve as a wedge between the tapered surface 146 of the fixed hub 133 and the tapered surface 147 of the driving gear 135 which are moved relative to each other in the longitudinal direction of the spindle 117. Thus, frictional force is caused on contact surfaces between the tapered surfaces 146, 147 and the rollers 137, and the rollers 137 revolve around the axis of the fixed hub 133 whiling rotating. Thus, the roller holding member 139 holding the rollers 137 and the spindle 117 are caused to rotate. Specifically, the torque of the driving gear 135 is transmitted to the roller holding member 139 via the rollers 137, and then the roller holding member 139 and the spindle 117 are caused to rotate at reduced speed in the same direction as the direction of rotation of the driving gear 135.

A biasing member in the form of the compression coil spring 149 which serves to release frictional contact is disposed between the roller holding member 139 and the bearing 141 for receiving the rear end of the spindle 117, and the roller holding member 139, the driving gear 135 and the spindle 117 are constantly biased forward by the compression coil spring 149. Therefore, when the driver bit 119 is not pressed against the workpiece, the roller holding member 139, the driving gear 135 and the spindle 117 are placed in a forward position and the distance between the tapered surface 146 of the fixed hub 133 and the tapered surface 147 of the driving gear 135 is increased. In this state, the rollers 137 held by the roller holding member 139 are no longer pressed against the tapered surface 146 of the fixed hub 133 or the tapered surface 147 of the driving gear 135, so that frictional force is not caused. Specifically, when the driver bit 119 is not pressed against the workpiece, the torque of the driving gear 135 is not transmitted to the roller holding member 139. In this power transmission interrupted state, even if the driving motor 111 is driven and the driving gear 135 is rotationally driven, the torque of the driving gear 135 is not transmitted to the roller holding member 139, or specifically, the driving gear 135 idles. Further, when the roller holding member 139 is moved to the forward (non-pressed) position by the compression coil spring 149, the flange 117c of the spindle 117 comes in contact with a stopper 107a formed on an inner wall surface of the gear housing 107, so that the roller holding member 139 is held in the forward (non-pressed) position.

The power transmitting mechanism 131 according to this embodiment which is constructed as described above serves as a speed reducing mechanism to transmit rotation of a driving-side member in the form of the driving gear 135 to a driven-side member in the form of the roller holding member 139 and the spindle 117 via an intervening member in the form of the rollers 137 at reduced speed, and also serves as a friction clutch to transmit torque and interrupt the torque transmission between the driving gear 135 and the roller holding member 139.

Operation of the electric screwdriver 101 constructed as described above is now explained. FIG. 2 shows an initial state in which a screw tightening operation is not yet performed (the driver bit 119 is not pressed against the workpiece). In this initial state, the roller holding member 139 is held in a forward position by the compression coil spring 149. Therefore, the rollers 137 are separated from the tapered surfaces 146, 147 and frictional force is not caused between the rollers 137 and the tapered surfaces 146, 147. When the driving motor 111 (see FIG. 1) is driven by depressing the trigger 109a (see FIG. 1), the driving gear 135 idles and the spindle 117 is not rotationally driven in the idling state. In this idling state, the compression coil spring 149 is not rotated, so that friction heating is not caused.

Specifically, when the driver bit 119 is not pressed against the workpiece, or when the rollers 137 are separated from the tapered surfaces 146, 147 (the rollers 137 are not pressed against the tapered surfaces 146, 147) by the biasing force of the compression coil spring 149, the power transmitting mechanism 131 of this embodiment is normally held in the idling state. In the idling state, even if the trigger 109a is depressed to drive the driving motor 111 and rotationally drive the driving-side member in the form of the driving gear 135, the torque of the driving gear 135 is not transmitted to the driven-side member in the form of the roller holding member 139.

In the above-described idling state, when a user moves the body 103 forward (toward the workpiece) and presses the screw S set on the driver bit 119 against the workpiece W in order to perform the screw tightening operation, the driver bit 119, the spindle 117, the roller holding member 139 and the driving gear 135 are pushed together toward the body 103 while compressing the compression coil spring 149. Specifically, they retract (move to the left as viewed in the drawings) with respect to the body 103. By the rearward movement of the driving gear 135, the distance between the tapered surface 147 of the driving gear 135 and the tapered surface 146 of the fixed hub 133 is decreased, so that the rollers 137 held by the roller holding member 139 are held between the tapered surfaces 146, 147 and pressed against the tapered surfaces 146, 147. In this state, the torque transmission is allowed. The state in which the roller holding member 139 is pushed toward the body 103 by pressing the above-described driver bit 119 against the workpiece and the torque transmission is allowed is a feature that corresponds to the "loaded conditions" according to the present invention. Further, the force of pushing the roller holding member 139 toward the body 103 is a feature that corresponds to the "pressing force" according to the present invention. Specifically, the power transmitting mechanism 131 of the screwdriver 101 is placed under loaded conditions when the driver bit 119 is pressed against the workpiece, and placed under unloaded conditions when the driver bit 119 is not pressed against the workpiece.

When the rollers 137 are pressed against the tapered surfaces 146, 147, frictional force is caused on contact surfaces (lines) between the rollers 137 and the tapered surfaces 146, 147 by the wedge action of the rollers. Therefore, the rollers 137 are caused to revolve while rotating on the tapered surface 146 of the fixed hub 133 by rotation of the driving gear 135. Thus, the roller holding member 139, the spindle 117 and the driver bit 119 are caused to rotate together in the same direction as the driving gear 135 at reduced speed lower than the rotation speed of the driving gear 135 and an operation of driving the screw S into the workpiece W is started. FIG. 3 shows a state immediately after the start of the screw tightening operation.

Figure 4:
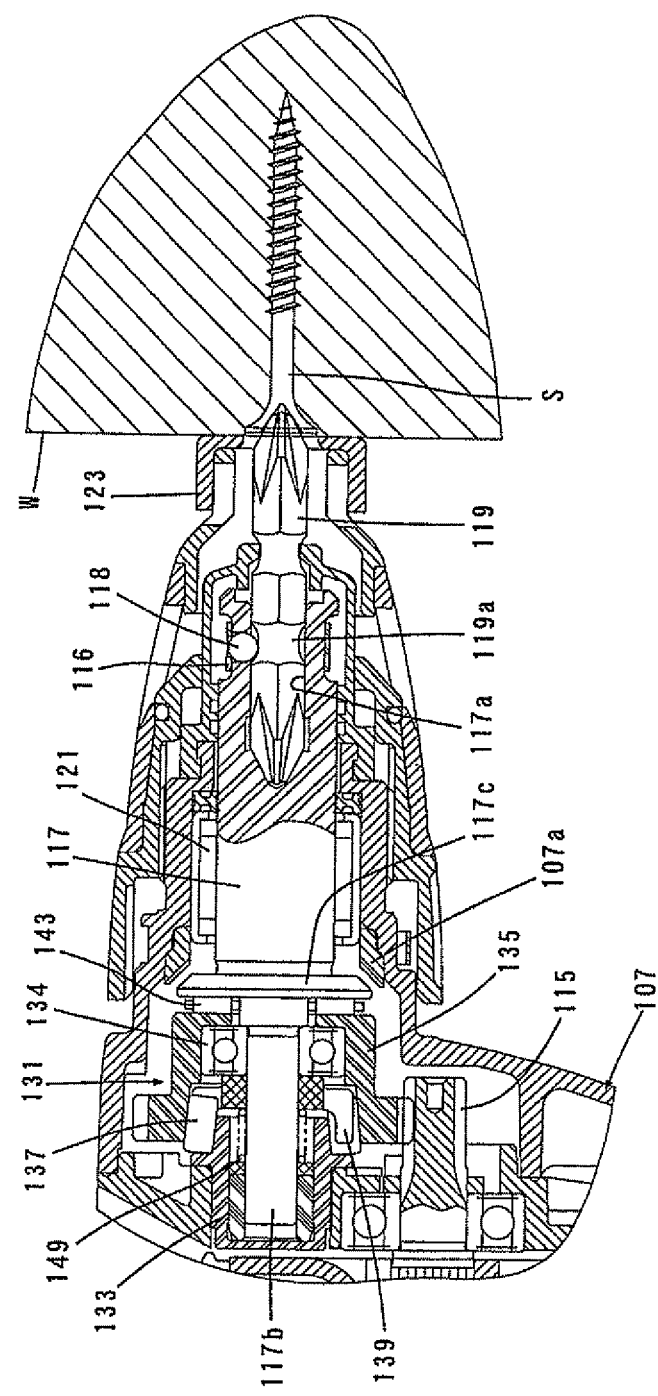
FIG. 4 is the enlarged view of the essential part of FIG. 1, in a state in which a locator for regulating a screw penetration depth is in contact with a workpiece.
Figure 5:
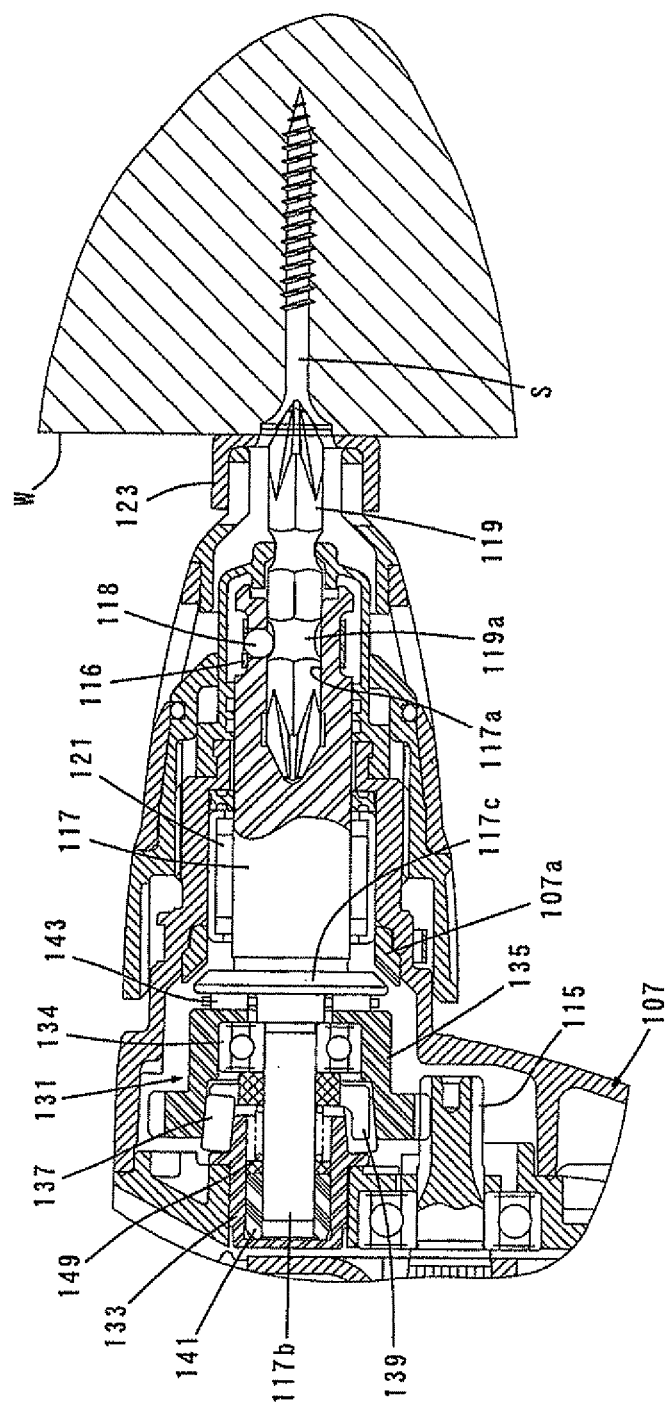
FIG. 5 is the enlarged view of the essential part of FIG. 1, in a state in which the screw tightening operation is completed (a state in which the driver bit is further driven in and power transmission is interrupted).

A locator 123 for regulating a screw penetration depth is mounted to the front end of the body 103. When the operation of driving the screw S into the workpiece W proceeds and a front end of the locator 123 comes in contact with the workpiece W as shown in FIG. 4, the locator 123 prevents the body 103 from further moving toward the workpiece W. Specifically, the locator 123 prevents the body 103 from moving toward the workpiece W over a point at a predetermined distance from the workpiece W. In this state in which the body 103 is prevented from further moving toward the workpiece W by the locator 123, the driver bit 119 further continues to rotate and the screw S is driven in. Therefore, the driver bit 119, the spindle 117 and the roller holding member 139 are caused to move toward the workpiece W with respect to the body 103 by the biasing force of the compression coil spring 149. By this movement, the rollers 137 are no longer pressed against the tapered surface 146 of the fixed hub 133 and the tapered surface 147 of the driving gear 135, so that the torque transmission from the driving gear 135 to the roller holding member 139 is interrupted. As a result, a screw tightening operation by the driver bit 119 is completed. This state is shown in FIG. 5.

As described above, according to this embodiment, the torque of the driving gear 135 which is rotationally driven by the driving motor 111 is transmitted to the driven-side member in the form of the roller holding member 139 at reduced speed. Thus, the screw tightening operation by the driver bit 119 can be performed.

In the power transmitting mechanism 131 according to this embodiment, frictional force is caused by pressing the rollers 137 against the tapered surface 146 of the fixed hub 133 and the tapered surface 147 of the driving gear 135 and the torque of the driving gear 135 is transmitted to the roller holding member 139 by this frictional force. With such a construction, backlash which is inevitable in a gear type speed reducing mechanism can be eliminated, so that noise which is caused when the power transmitting mechanism 131 is driven can be reduced. Further, with the construction in which the torque transmission is made by frictional force, the power transmitting mechanism 131 can have a simpler shape and thus can be easier to manufacture when compared with the known planetary gear mechanism.

According to this embodiment, a pushing force with which the rollers 137 are pushed in between the tapered surface 146 of the fixed hub 133 and the tapered surface 147 of the driving gear 135 by pressing the driver bit 119 against the workpiece is amplified by the wedging effect, and the amplified force can act on the tapered surfaces 146, 147 in the radial direction perpendicular to the longitudinal direction of the driving gear 135. With such a construction, higher frictional force can be obtained and the power transmitting performance can be enhanced. In this case, provided that the tapered surfaces 146, 147 have an inclination angle θ with respect to the longitudinal direction of the driving gear 135 (the longitudinal direction of the spindle 117), this pushing force can be amplified about (1/tan θ) time. Therefore, the inclination angle θ of the tapered surfaces 146, 147 is set to an angle above zero and below 45 degrees, and particularly preferably to 20 degrees or below.

The power transmitting mechanism 131 according to this embodiment serves as both the planetary gear speed reducing mechanism and the friction clutch, so that the entire mechanism can be reduced in size compared with a construction in which these two functions are separately provided. Further, according to this embodiment, rotation speed is also reduced at the clutch part, so that the speed reduction ratio between the driving gear 135 and the pinion gear 115 can be reduced and the size of the driving gear 135 can be reduced in the radial direction. Therefore, the distance from the axis of the spindle 117 to the body 103, or the center height can be reduced.

Second Embodiment of the Invention

Figure 8:
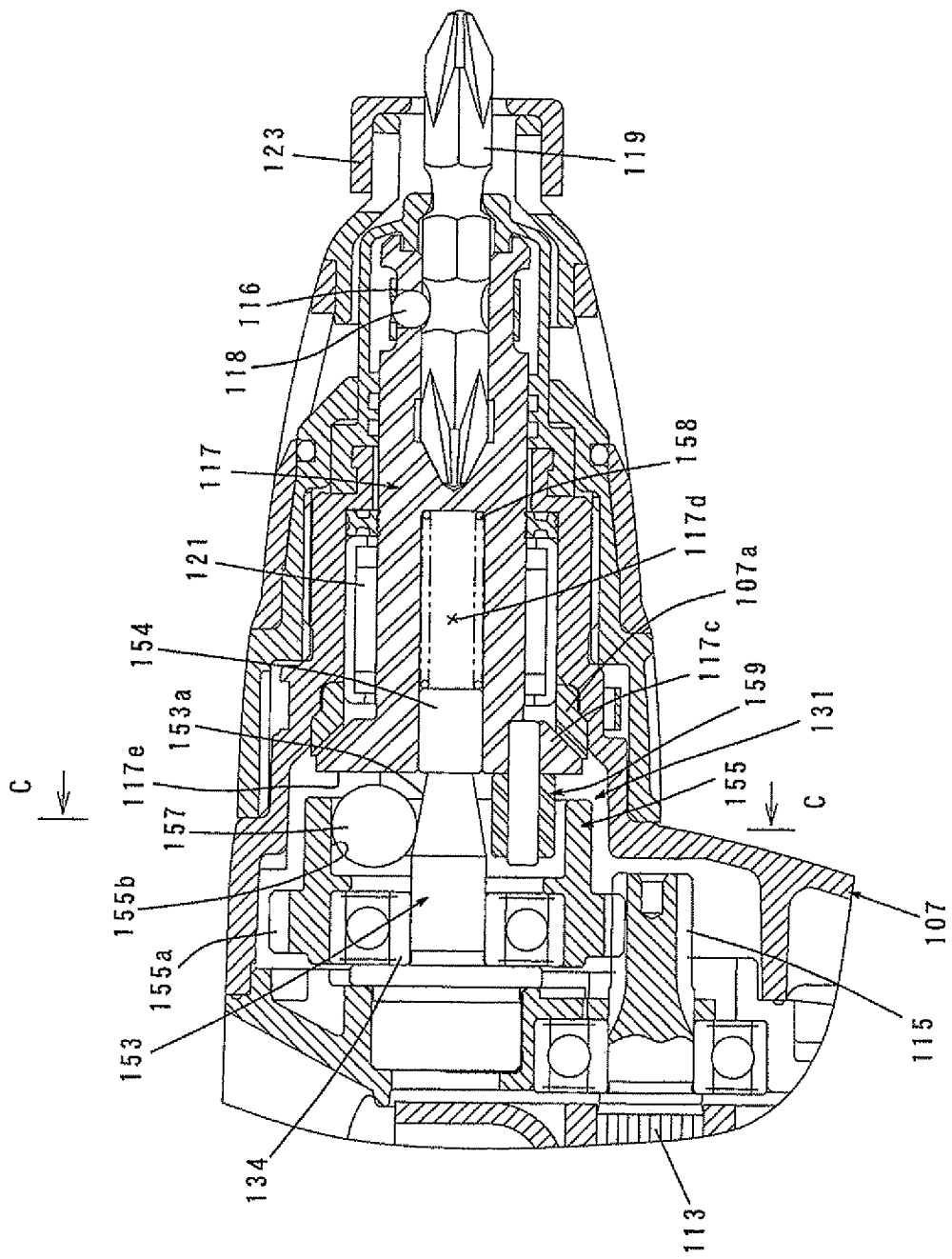
FIG. 8 is a sectional view showing a power transmitting mechanism of a screwdriver according to a second embodiment of the present invention, in an initial state in which power transmission is interrupted.
Figure 9:
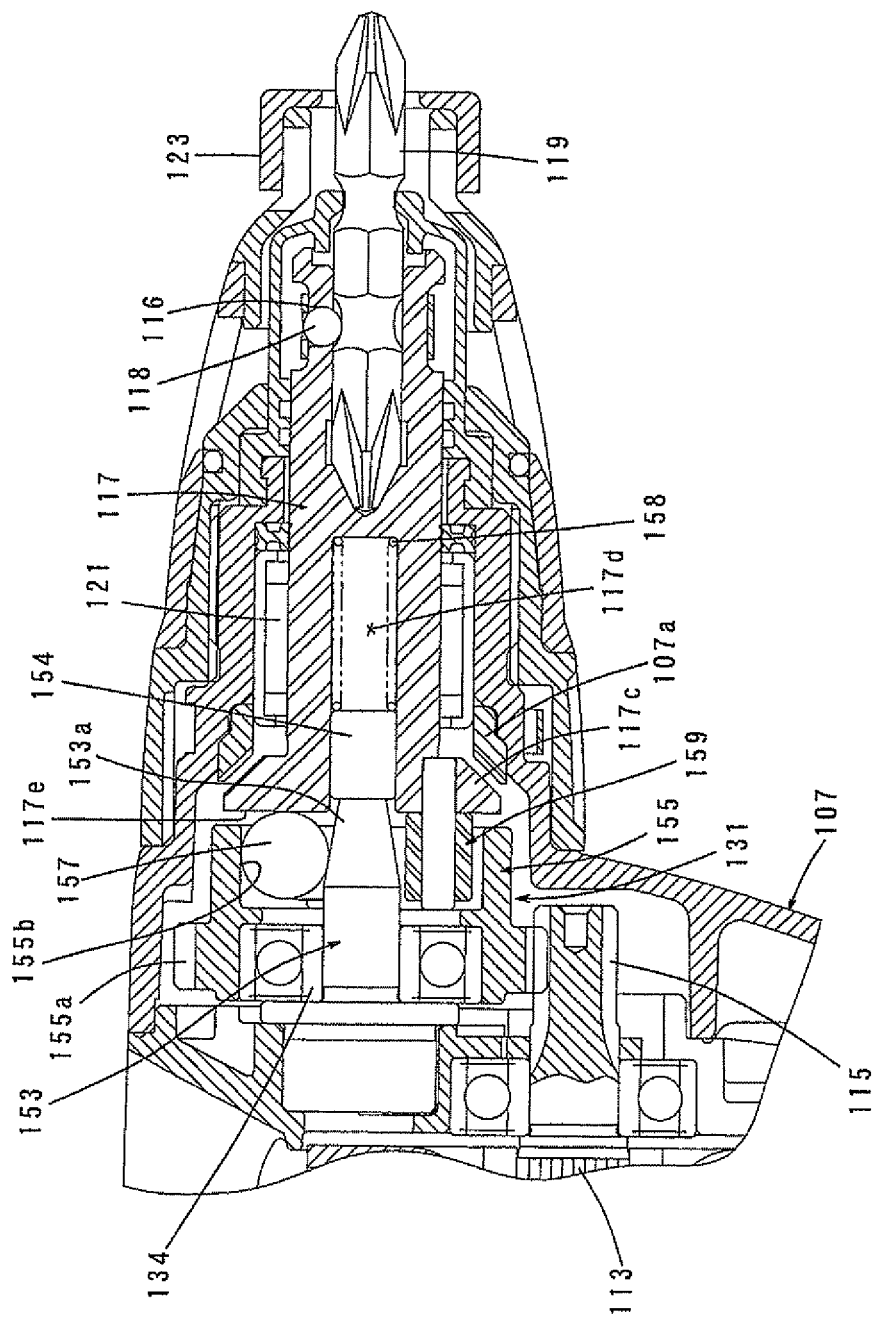
FIG. 9 is also a sectional view showing the power transmitting mechanism, in a power transmission state.

A second embodiment of the present invention is now described with reference to FIGS. 8 to 10. This embodiment relates to a modification of the power transmitting mechanism 131 of the screwdriver 101 and mainly includes a planetary gear speed reducing mechanism of a planetary ball type. As shown in FIGS. 8 and 9, the power transmitting mechanism 131 has a plurality of balls (steel balls) 157 which correspond to the planetary member of the planetary gear speed reducing mechanism. The balls 157 revolve around a fixed hub 153 which corresponds to the sun member of the planetary gear speed reducing mechanism, while rotating, so that rotation of a driving gear 155 which corresponds to the outer ring member of the planetary gear speed reducing mechanism is transmitted to a ball holding member 159 which corresponds to the carrier of the planetary gear speed reducing mechanism. The driving gear 155, the ball holding member 159 and the balls 157 are features that correspond to the "driving-side member", the "driven-side member" and the "intervening member", respectively, according to the present invention.

The fixed hub 153 is a columnar member (rod-like member) having a conical tapered surface 153a on its front outer circumferential surface in the longitudinal direction, and disposed at the rear of the spindle 117 on the axis of the spindle 117. Further, a rear end portion of the fixed hub 153 is fixed to the gear housing 107 and a front end shank of the fixed hub 153 is inserted into a longitudinally extending spring receiving hole 117d formed in the center of the rear portion of the spindle 117 such that it can rotate and move in the longitudinal direction with respect to the spindle 117. The tapered surface 153a of the fixed hub 153 is tapered forward (toward the driver bit) and is a feature that corresponds to the "tapered portion" according to the present invention. Further, the spindle 117 does not have the small-diameter shank 117b as described in the first embodiment. The inclination angle of the tapered surface 153a with respect to the longitudinal direction of the spindle 117 is set similarly to that of the above-described first embodiment.

The driving gear 155 is formed as a generally cylindrical member and coaxially disposed over the fixed hub 153, and a rear end portion of the driving gear 155 in the axial direction is rotatably mounted on the outer surface of the fixed hub 153 via a bearing 134. Teeth 155a are formed in the outer periphery of the barrel of the driving gear 155 and constantly engaged with the pinion gear 115 of the motor shaft 113. Further, a front region of an inner circumferential surface of the barrel of the driving gear 155 forms an inner circumferential surface 155b parallel to the longitudinal direction of the spindle 117, and the inner circumferential surface 155b is opposed to the tapered surface 153a of the fixed hub 153 with a predetermined space.

Figure 10:
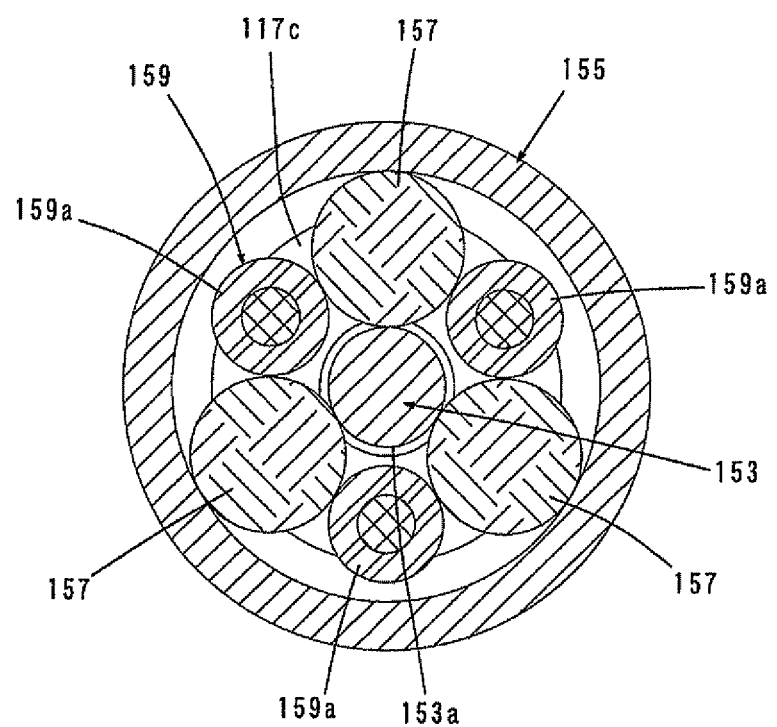
FIG. 10 is a sectional view taken along line C-C in FIG. 8.

As shown in FIG. 10, the balls 157 are disposed between the tapered surface 153a of the fixed hub 153 and the inner circumferential surface 155b of the driving gear 155. The ball holding member 159 includes a plurality of cylindrical elements 159a which are mounted on the rear end of the spindle 117 and spaced at predetermined intervals in the circumferential direction. Further, the ball holding member 159 holds the balls 157 between the adjacent cylindrical elements 159a such that the balls 157 are prevented from moving in the circumferential direction. The balls 157 held by the ball holding member 159 face a rear end surface 117e of the spindle 117. A biasing member in the form of a compression coil spring 158 for releasing frictional contact is disposed within the spring receiving hole 117d of the spindle 117. One end of the compression coil spring 158 is held in contact with a bottom of the spring receiving hole 117d and the other end is held in contact with a front end surface of a needle pin 154 which is fitted in the spring receiving hole 117d and can slide in the longitudinal direction. The rear end surface of the needle pin 154 is held in contact with the front end surface of the fixed hub 153 and the biasing force of the compression coil spring 158 acting on the needle pin 154 is received by the front end surface of the fixed hub 153. Thus, the spindle 117 is constantly biased forward. In this state, the balls 157 are separated from the rear end surface 117e of the spindle 117 and not pressed against the tapered surface 153a of the fixed hub 153 and the inner circumferential surface 155b of the driving gear 155.

In the other points, this embodiment has the same construction as the above-described first embodiment. Therefore, components in this embodiment which are substantially identical to those in the first embodiment are given like numerals as in the first embodiment, and they are not described.

The power transmitting mechanism 131 according to this embodiment is constructed as described above. FIG. 8 shows an initial state in which the screw tightening operation is not yet performed (the driver bit 119 is not pressed against the workpiece). In this initial state, the ball holding member 159 is moved forward together with the spindle 117 by the compression coil spring 158, and the balls 157 are not pressed against the tapered surface 153a of the fixed hub 153 and the inner circumferential surface 155b of the driving gear 155. Specifically, in this state, the torque of the driving gear 155 is not transmitted to the ball holding member 159. In this power transmission interrupted state, when the trigger (not shown) is depressed to drive the driving motor, the driven gear 155 is caused to idle, and in the idling state, the spindle 117 is not rotationally driven.

In the idling state, when a screw (not shown) is set on the driver bit 119 and the driver bit 119 is pressed against the workpiece, the driver bit 119, the spindle 117 and the ball holding member 159 are pushed together toward the body 103 while compressing the compression coil spring 158. Then the rear end surface 117e of the spindle 117 pushes the balls 157 rearward, so that the balls 157 are pushed in between the tapered surface 153a of the fixed hub 153 and the inner circumferential surface 155b of the driving gear 155. In this state, the torque transmission is allowed. The state in which the roller holding member 159 is pushed toward the body 103 by pressing the above-described driver bit 119 against the workpiece and the torque transmission is allowed is a feature that corresponds to the "loaded conditions" according to the present invention. Further, this force of pushing the roller holding member 159 toward the body 103 is a feature that corresponds to the "pressing force" according to the present invention.

The balls 157 are pushed in between the tapered surface 153a and the inner circumferential surface 155b and serve as a wedge. As a result, frictional force is caused on contact surfaces (points) between the tapered surface 153a and the balls 157 and between the inner circumferential surface 155b and the balls 157, and the balls 157 are caused to roll on the tapered surface 153a of the fixed hub 153 in the circumferential direction by receiving the torque of the rotating driving gear 155. Specifically, the balls 157 are caused to revolve while rotating. Therefore, the ball holding member 159, the spindle 117 and the driver bit 119 are caused to rotate in the same direction at reduced speed lower than the revolution speed of the balls 157 or the rotation speed of the driving gear 155, and the screw is driven into the workpiece. This state is shown in FIG. 9. Further, in the screw tightening operation, like in the above-described first embodiment, the screw penetration depth is regulated by contact of the locator 123 with the workpiece, and transmission of rotation from the driving gear 155 to the driven-side member in the form of the ball holding member 159 is interrupted upon further screw driving after contact of the locator 123 with the workpiece.

According to this embodiment, the balls 157 are pushed in between the tapered surface 153a of the fixed hub 153 and the inner circumferential surface 155b of the driving gear 155, so that the frictional force is caused therebetween and causes the balls 157 to rotate and revolve. As a result, the torque of the driving-side member in the form of the driving gear 155 is transmitted to the driven-side member in the form of the ball holding member 159 and the spindle 117. With such a construction, this embodiment has substantially the same effects as the above-described first embodiment. For example, backlash which is inevitable in a gear type speed reducing mechanism can be eliminated, so that noise which is caused when the power transmitting mechanism 131 is driven can be reduced. Further, the pushing force of the spindle 117 in the longitudinal direction is amplified to a force in a radial direction transverse to the longitudinal direction by the wedging effect, so that higher frictional force can be obtained and the power transmitting performance can be enhanced. Further, in this embodiment, it may also be constructed such that the inner circumferential surface 155b of the driving gear 155 is configured as a tapered surface and the tapered surface 153a of the fixed hub 153 as a parallel surface, or such that both the inner circumferential surface 155b of the driving gear 155 and the outer circumferential surface of the fixed hub 153 are configured as a tapered surface.

Third Embodiment of the Invention

Figure 11:
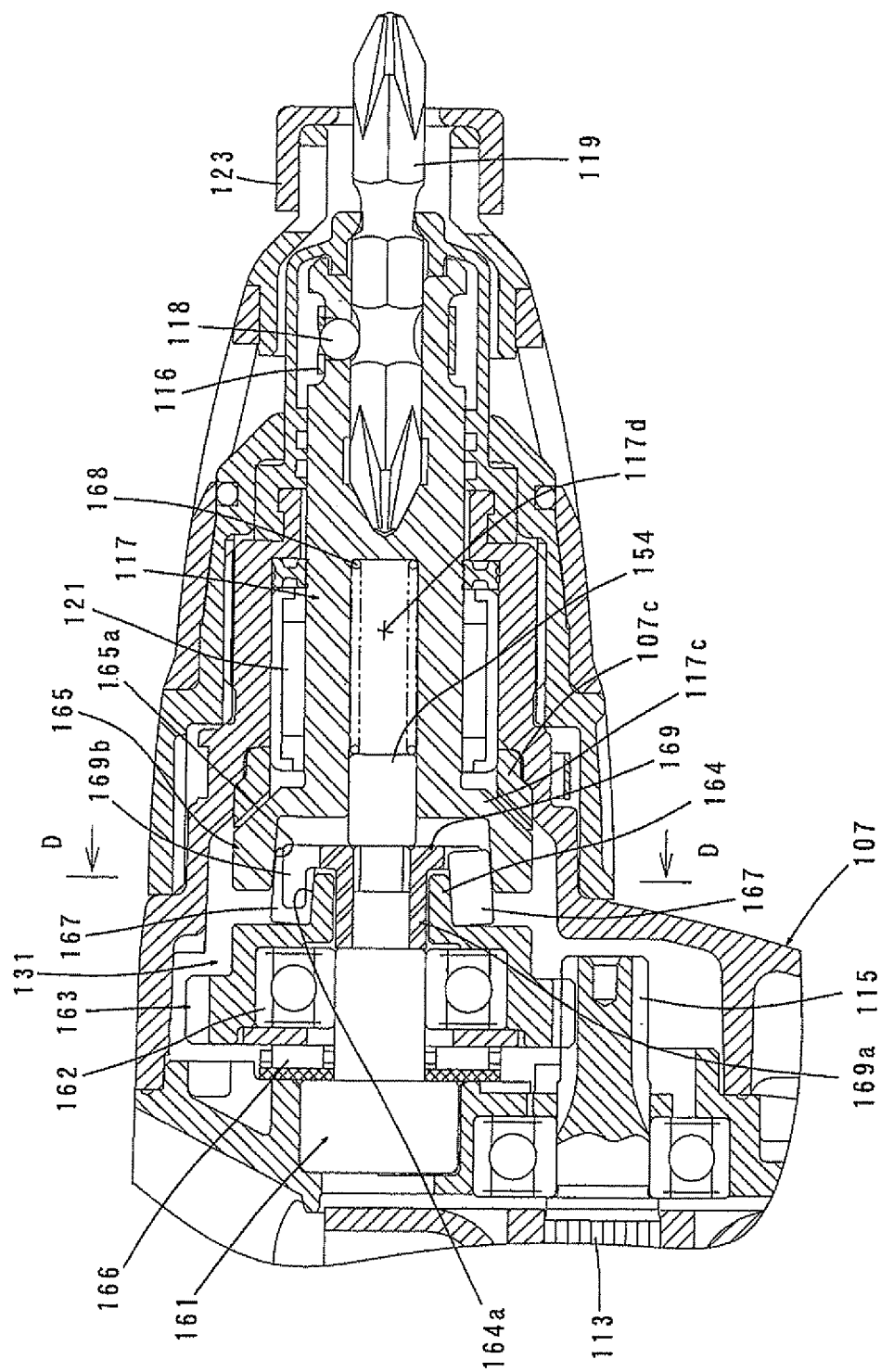
FIG. 11 is a sectional view showing a power transmitting mechanism of a screwdriver according to a third embodiment of the present invention, in an initial state in which power transmission is interrupted.
Figure 12:
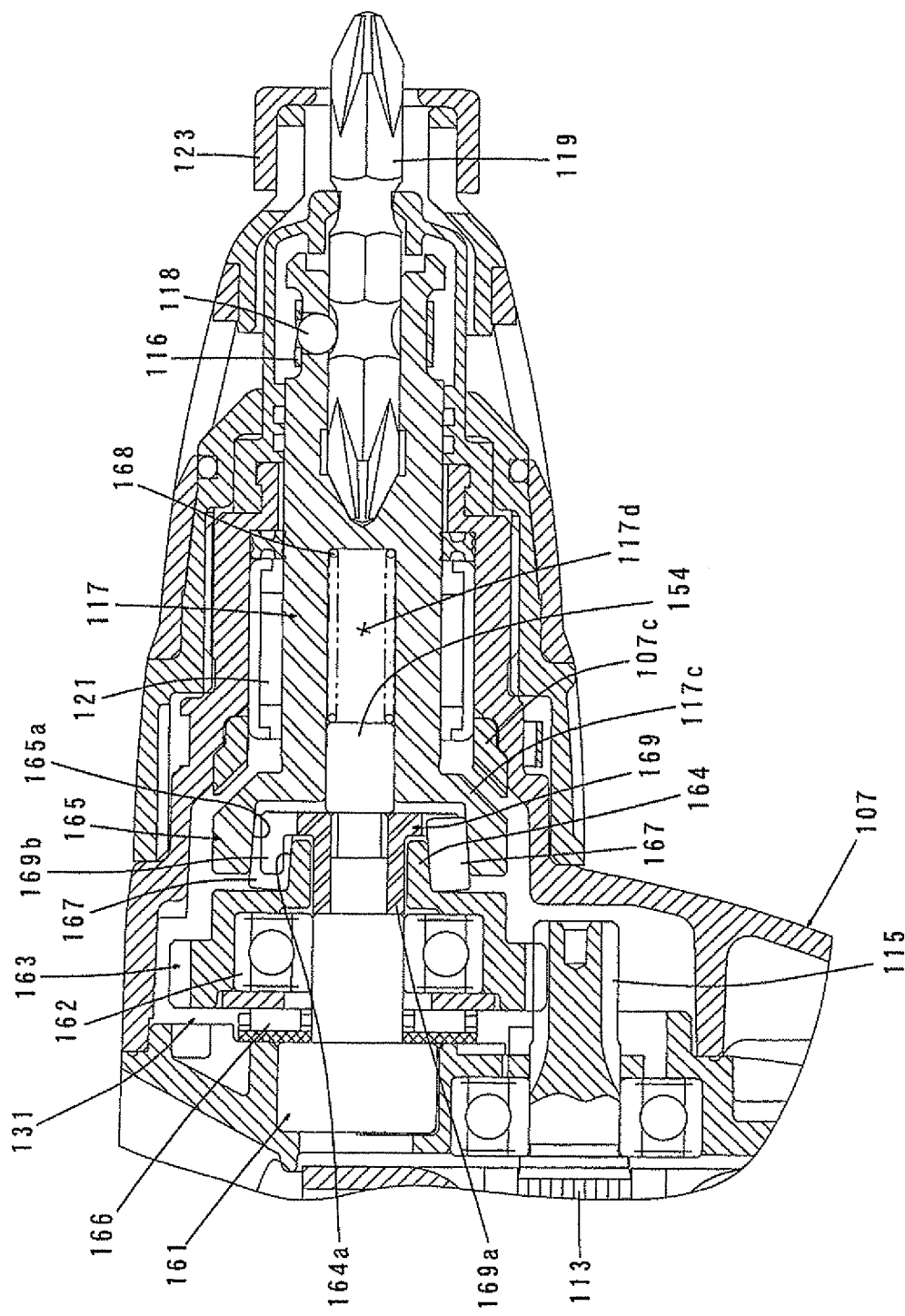
FIG. 12 is also a sectional view showing the power transmitting mechanism, in a power transmission state.
Figure 13:
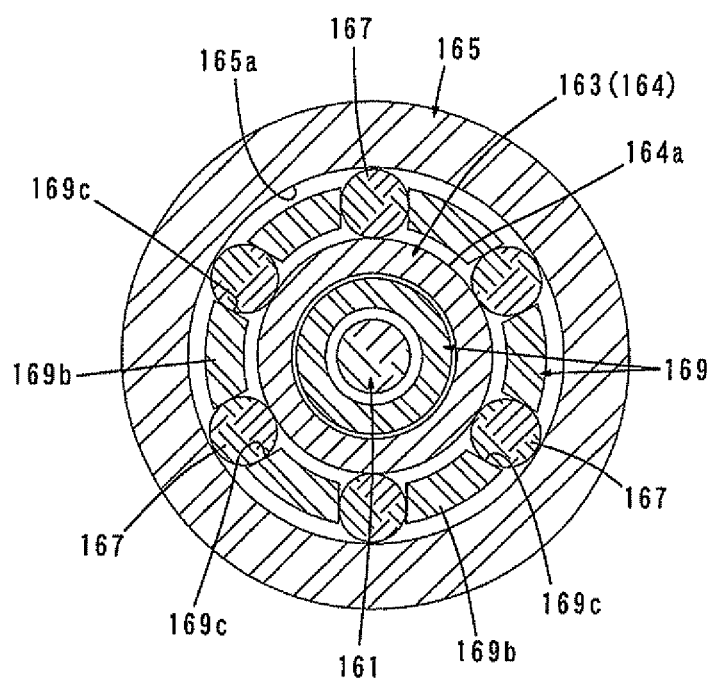
FIG. 13 is a sectional view taken along line D-D in FIG. 11.

A third embodiment of the present invention is now described with reference to FIGS. 11 to 13. This embodiment relates to a modification of the power transmitting mechanism 131 of the screwdriver 101 and mainly includes a planetary gear speed reducing mechanism of a non-revolving planetary roller type. As shown in FIGS. 11 and 12, the power transmitting mechanism 131 mainly includes a fixed hub 161, a driving gear 163 which corresponds to the sun member of the planetary gear speed reducing mechanism, a driven-side cylindrical portion 165 which is integrally formed on the rear end of the spindle 117 and corresponds to the outer ring member of the planetary gear speed reducing mechanism, a plurality of columnar rollers 167 which are disposed between the driving gear 163 and the driven-side cylindrical portion 165 and correspond to the planetary member of the planetary gear speed reducing mechanism, and a fixed roller holding member 169 which serves to hold the rollers 167 and corresponds to the carrier of the planetary gear speed reducing mechanism. The driving gear 163, the driven-side cylindrical portion 165 and the rollers 167 are features that correspond to the "driving-side member", the "driven-side member" and the "intervening member", respectively, according to the present invention.

A rear end portion of the fixed hub 161 in the longitudinal direction of the spindle 117 is fixed to the gear housing 107 rearward of the spindle 117, and the fixed hub 161 supports the driving gear 163 via a bearing 162 such that the driving gear 163 can rotate. The driving gear 163 is constantly engaged with the pinion gear 115 of the motor shaft 113 and has a cylindrical portion 164 protruding a predetermined distance forward on its front, and a tapered surface 164a is formed on an outer circumferential surface of the cylindrical portion 164. Further, a rear surface of the driving gear 163 is supported by the gear housing 107 via a thrust bearing 166, so that the thrust bearing 166 can receive the pushing force in the screw tightening operation.

The driven-side cylindrical portion 165 formed integrally with the spindle 117 is disposed over the cylindrical portion 164 of the driving gear 163, and has an inner circumferential surface formed by a tapered surface 165a. The tapered surface 164a of the driving gear 163 and the tapered surface 165a of the driven-side cylindrical portion 165 are features that correspond to the "tapered portion" according to the present invention. The tapered surface 164a of the driving gear 163 is tapered forward (toward the driver bit) and the tapered surface 165a of the driven-side cylindrical portion 165 is also tapered forward. Further, the inclination angle of the tapered surfaces 164a, 165a with respect to the longitudinal direction of the spindle 117 is set similarly to that of the above-described first embodiment.

The driving gear 163 and the driven-side cylindrical portion 165 are coaxially disposed. The tapered surface 164a of the driving gear 163 and the tapered surface 165a of the driven-side cylindrical portion 165 are opposed to each other with a predetermined space in the radial direction transverse to the longitudinal direction of the spindle 117, and within this space, the rollers 167 are disposed in the circumferential direction. The roller holding member 169 for holding the rollers 167 is a generally cylindrical member disposed between the driving gear 163 and the spindle 117, and a boss part 169a of the roller holding member 169 is fixed to the front end of the fixed hub 161. In the roller holding member 169, a barrel part 169b forming a circumferential wall surface is disposed between the tapered surface 164a of the driving gear 163 and the tapered surface 165a of the driven-side cylindrical portion 165, and the rollers 167 are rotatably held by the barrel part 169b. Specifically, as shown in FIG. 13, a plurality of axially extending roller installation grooves 169c are formed in the barrel part 169b of the roller holding member 169 and spaced at predetermined (equal) intervals in the circumferential direction. The rollers 167 are loosely fitted in the roller installation grooves 169c. The rollers 167 are held by the roller holding member 169 such that the rollers are allowed to rotate within the roller installation grooves 169c and move in the radial direction of the roller holding member 169, but the rollers are prevented from moving in the circumferential direction with respect to the roller holding member 169.

As shown in FIGS. 11 and 12, a longitudinally extending spring receiving hole 117d is formed in the center of the rear portion of the spindle 117 and the biasing member in the form of a compression coil spring 168 which serves to release frictional contact is disposed within the spring receiving hole 117d. One end of the compression coil spring 168 is held in contact with a bottom of the spring receiving hole 117d and the other end is held in contact with a front end surface of a needle pin 154 which is fitted in the spring receiving hole 117*d* and can slide in the longitudinal direction. A rear end surface of the needle pin 154 is held in contact with the front end surface of the fixed hub 161 and the biasing force of the compression coil spring 168 acting on the needle pin 154 is received by the front end surface of the fixed hub 161. Thus, the spindle 117 is constantly biased forward. In this state, the distance between the tapered surface 164*a* of the driving gear 163 and the tapered surface 165*a* of the driven-side cylindrical portion 165 is increased in the radial direction. Therefore, the rollers 167 are not pressed against the tapered surfaces 164*a*, 165*a* and frictional force is not caused.

In the other points, this embodiment has the same construction as the above-described first embodiment. Therefore, components in this embodiment which are substantially identical to those in the first embodiment are given like numerals as in the first embodiment, and they are not described.

The power transmitting mechanism 131 according to this embodiment is constructed as described above. FIG. 11 shows an initial state in which the screw tightening operation is not yet performed (the driver bit 119 is not pressed against the workpiece). In this initial state, the driven-side cylindrical portion 165 is moved forward together with the spindle 117 by the compression coil spring 168 and the rollers 167 are not pressed against the tapered surfaces 164*a*, 165*a*. In this state, the torque of the driving gear 163 is not transmitted to the driven-side cylindrical portion 165. In this power transmission interrupted state, when the trigger (not shown) is depressed to drive the driving motor, the driving gear 163 is caused to idle, and in the idling state, the spindle 117 is not rotationally driven.

In this idling state, when a screw (not shown) is set on the driver bit 119 and the driver bit 119 is pressed against the workpiece, the driver bit 119, the spindle 117 and the driven-side cylindrical portion 165 are pushed together toward the body 103 while compressing the compression coil spring 168. By this movement, the distance between the tapered surface 165*a* of the driven-side cylindrical portion 165 and the tapered surface 164*a* of the driving gear 163 is decreased in the radial direction, and the rollers 167 are pushed in between the tapered surfaces 164*a*, 165*a*. In this state, the torque transmission is allowed. The state in which the driven-side cylindrical portion 165 is pushed toward the body 103 by pressing the above-described driver bit 119 against the workpiece and the torque transmission is allowed is a feature that corresponds to the "loaded conditions" according to the present invention. Further, this force of pushing the driven-side cylindrical portion 165 toward the body 103 is a feature that corresponds to the "pressing force" according to the present invention.

The rollers 167 are pushed in between the tapered surfaces 164*a*, 165*a* and serve as a wedge. As a result, frictional force is caused on contact surfaces (lines) between the tapered surfaces 164*a*, 165*a* and the rollers 167, and the rollers 167 are caused to rotate on the tapered surface 164*a* of the rotating driving gear 163, and thus the driven-side cylindrical portion 165 is caused to rotate. Specifically, the driven-side cylindrical portion 165, the spindle 117 and the driver bit 119 are caused to rotate in an opposite direction from the driving gear 163 at reduced speed lower than the rotation speed of the driving gear 163, and the screw is driven into the workpiece. This state is shown in FIG. 12. Further, in the screw tightening operation, like in the above-described first embodiment, the screw penetration depth is regulated by contact of the locator 123 with the workpiece, and transmission of rotation from the driving gear 163 to the driven-side cylindrical portion 165 is interrupted upon further screw driving after contact of the locator 123 with the workpiece.

According to this embodiment, the rollers 167 are pushed in between the tapered surface 164*a* of the driving gear 163 and the tapered surface 165*a* of the driven-side cylindrical portion 165, so that the frictional force is caused therebetween and the torque of the driving gear 163 is transmitted to the driven-side cylindrical portion 165 and the spindle 117. With such a construction, this embodiment has substantially the same effects as the above-described first embodiment. For example, backlash which is inevitable in a gear type speed reducing mechanism can be eliminated, so that noise which is caused when the power transmitting mechanism 131 is driven can be reduced. Further, the pushing force of the spindle 117 in the longitudinal direction is amplified to a force in a radial direction transverse to the longitudinal direction by the wedging effect, so that higher frictional force can be obtained and the power transmitting performance can be enhanced.

Fourth Embodiment of the Invention

Figure 14:
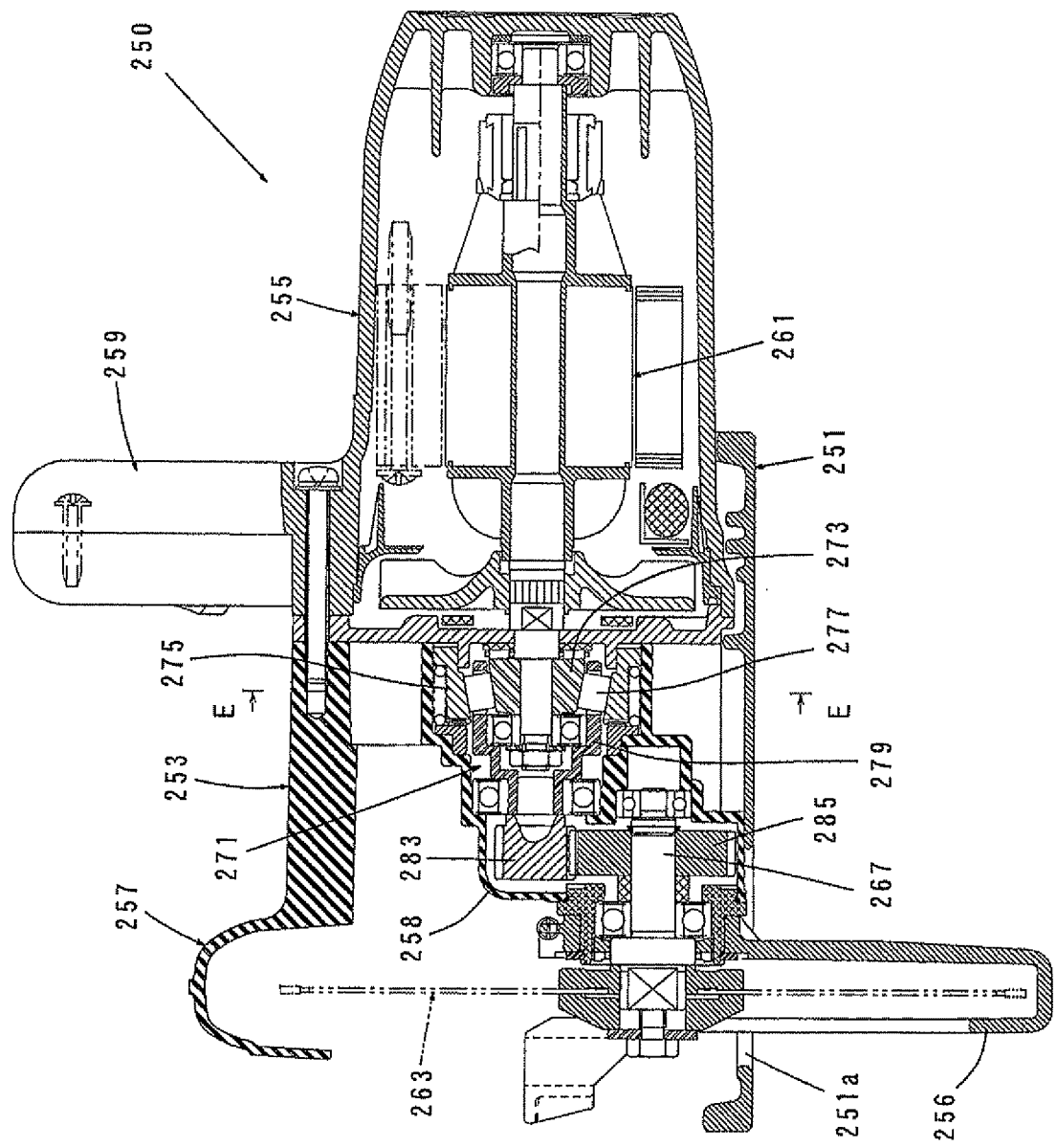
FIG. 14 is a sectional view showing a power transmitting mechanism of an electric circular saw according to a fourth embodiment of the present invention, in an initial state in which power transmission is interrupted.

A fourth embodiment of the present invention is now described with reference to FIGS. 14 to 17. This embodiment is explained as being applied to a cutting tool in the form of an electric circular saw 250 that performs a cutting operation on a workpiece. As shown in FIG. 14, the electric circular saw 250 according to this embodiment mainly includes a base 251 which is placed on a workpiece (not shown) and moved in a cutting direction, and a power tool body in the form of a circular saw body 253 which is disposed above the base 251 and connected to the base 251.

The circular saw body 253 mainly includes a motor housing 255 that houses a driving source in the form of a driving motor 261, a blade case 257 that covers substantially an upper half of a disc-like blade (saw blade) 263 which is rotated in a vertical plane and houses a power transmitting mechanism 271, and a handgrip 259 that is designed to be held by a user to operate the circular saw 250. The blade 263 is removably attached to a final output shaft in the form of a spindle (blade mounting shaft) 267 in the power transmitting mechanism 271. The blade 263 is a feature that corresponds to the "tool bit" according to the present invention. Further, the spindle 267 and a motor shaft 262 of the driving motor 261 are disposed in parallel to each other.

A safety cover 256 is rotatably attached to the blade case 257 and covers a lower half of the blade 263. A lower edge portion of the blade 263 including the safety cover 256 protrudes from the lower surface of the base 251 through an opening 251*a* formed in the base 251. When a front end of the base 251 is placed on a workpiece and moved forward in order to cut the workpiece, a front end of the safety cover 256 in a direction of movement is pushed by the workpiece, so that the safety cover 256 is retracted and housed within the blade case 257. The handgrip 259 is connected to an upper region of the motor housing 255 and has a trigger (not shown) which is depressed by the user's finger to drive the driving motor 261. The blade 263 is rotationally driven via the power transmitting mechanism 271 when the driving motor 261 is driven.

Figure 15:
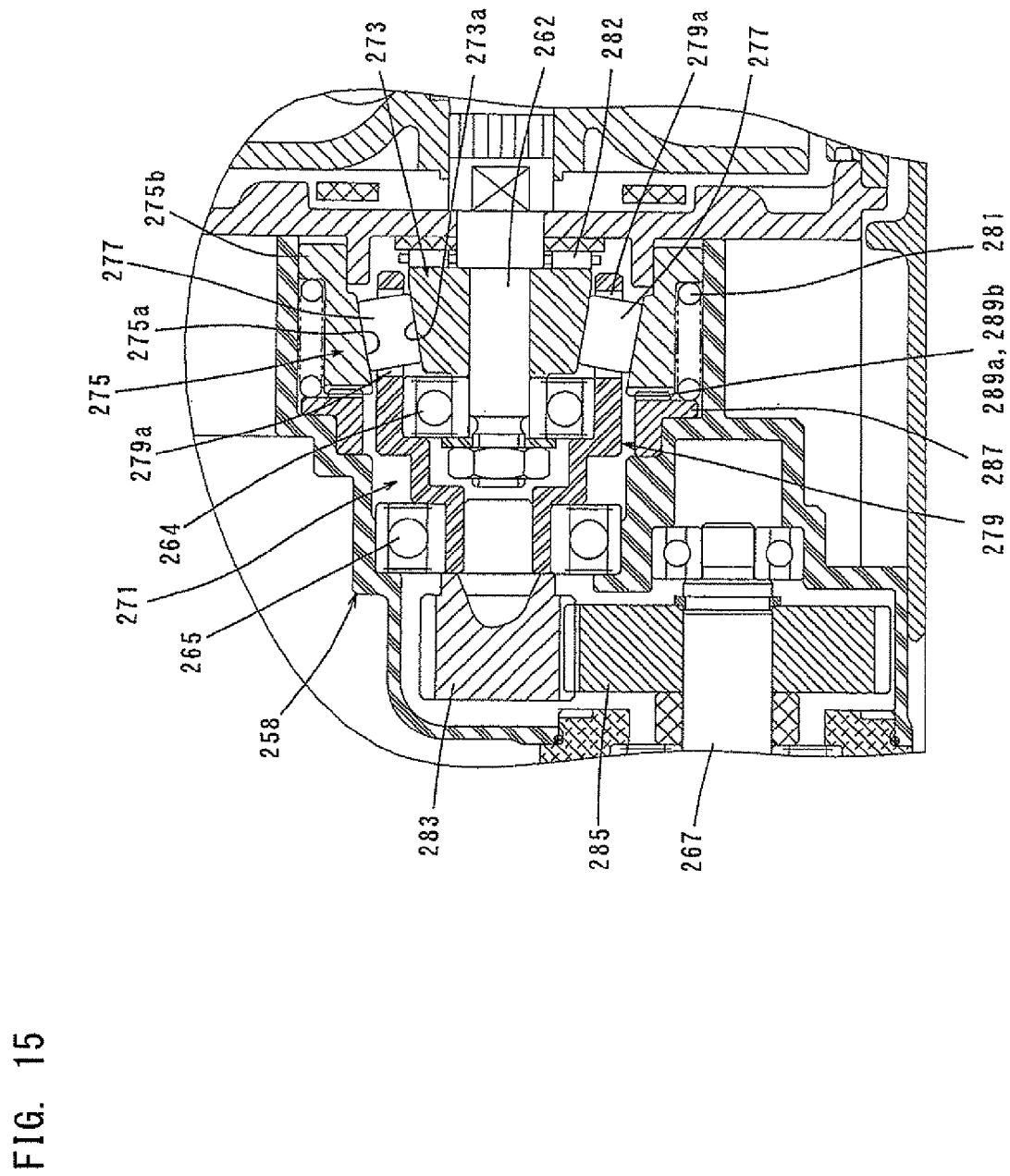
FIG. 15 is also an enlarged sectional view showing the power transmitting mechanism.

The power transmitting mechanism 271 is now explained with reference to FIG. 15. The power transmitting mechanism 271 according to this embodiment mainly includes a planetary gear speed reducing mechanism of a planetary roller type and is housed in an inner housing 258 disposed within the blade case 257. The power transmitting mechanism 271 mainly includes a driving hub 273, an outer annular member 275, a plurality of columnar rollers 277 disposed between the driving hub 273 and the outer annular member 275, and a roller holding member 279 for holding the rollers 277. The driving hub 273, the roller holding member 279 and the rollers 277 are features that correspond to the "driving-side member", the "driven-side member" and the "intervening member", respectively, according to the present invention.

The driving hub 273 corresponds to the sum member of the planetary gear speed reducing mechanism. The driving hub 273 is fixed on the motor shaft 262 of the driving motor 261 and rotates together with the motor shaft 262. Further, the driving hub 273 is configured as a columnar (cylindrical) member that has a conical tapered surface 273a on its outer circumferential surface.

The outer annular member 275 corresponds to the outer ring member of the planetary gear speed reducing mechanism and is irrotationally mounted to the inner housing 258. Further, the outer annular member 275 is a generally cylindrical member which is coaxially disposed outside the driving hub 273, and its inner circumferential surface is formed by a conical tapered surface 275a corresponding to the tapered surface 273a of the driving hub 273. The tapered surface 273a of the driving hub 273 and the tapered surface 275a of the outer annular member 275 are features that correspond to the "tapered portion" according to the present invention. Further, the tapered surfaces 273a, 275a are tapered toward the front end region of the motor shaft 262 (toward the blade 263) and opposed to each other with a predetermined space in the radial direction. The inclination angle of the tapered surfaces 273a, 275a with respect to the longitudinal direction of the spindle 267 (the longitudinal direction of the motor shaft 262) is set similarly to that of the above-described first embodiment.

A plurality of rollers 277 correspond to the planetary member of the planetary gear speed reducing mechanism and are disposed between the tapered surface 273a of the driving hub 273 and the tapered surface 275a of the outer annular member 275. Further, the rollers 277 are formed as a parallel roller and assembled in contact and in parallel to the tapered surface 273a of the driving hub 273 and the tapered surface 275a of the outer annular member 275 when disposed between the tapered surfaces 273a, 275a.

Figure 16:
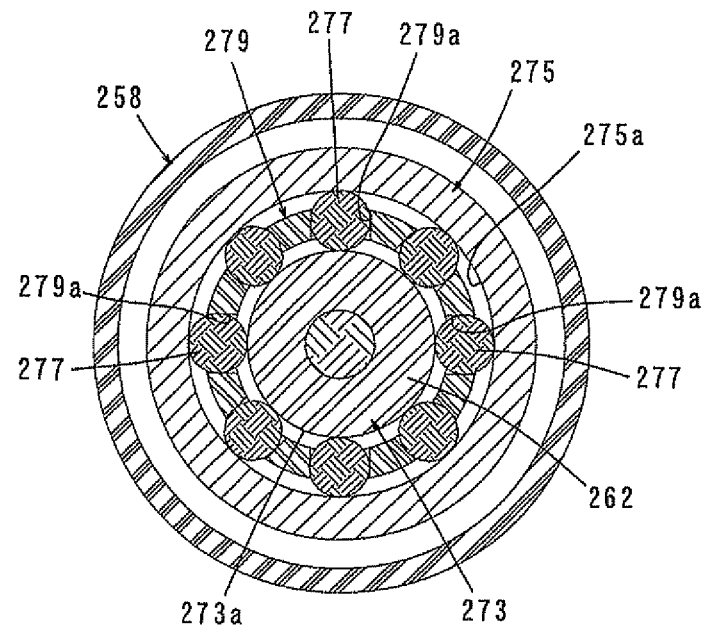
FIG. 16 is a sectional view taken along line E-E in FIG. 14.
Figure 17:
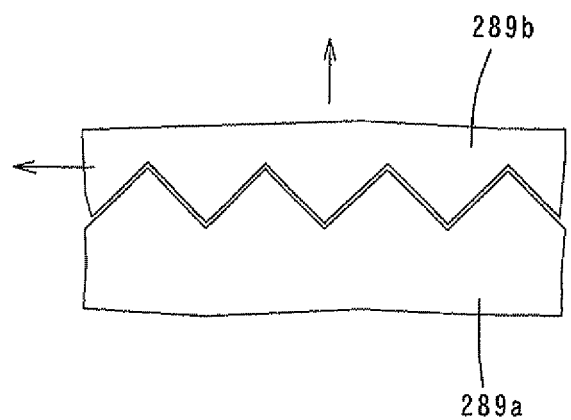
FIG. 17 is a schematic illustration showing the shape of a cam face.

The roller holding member 279 for holding the rollers 277 corresponds to the carrier of the planetary gear speed reducing mechanism and is formed as a generally cylindrical member which is coaxially disposed with the motor shaft 262 in the front end region of the motor shaft 262. Further, an inner surface of one axial end portion of the roller holding member 279 is supported by the motor shaft 262 via a bearing 264 and an outer surface of the other axial end portion is supported by the inner housing 258 via a bearing 265. As shown in FIGS. 15 and 16, the one axial end portion of the roller holding member 279 which is rotatably supported via the bearings 264, 265 is disposed between the tapered surface 273a of the driving hub 273 and the tapered surface 275a of the outer annular member 275 such that it cannot interfere with the tapered surfaces. Further, a plurality of roller installation grooves 279a are formed in the one axial end portion at predetermined intervals in the circumferential direction. The rollers 277 are loosely fitted in the roller installation grooves 279a and held such that the rollers are allowed to rotate within the roller installation grooves 279a and prevented from moving in the circumferential direction with respect to the roller installation grooves 279a.

Further, the outer annular member 275 is mounted to the inner housing 258 such that it can move in the longitudinal direction of the spindle 267, and is constantly biased by a compression coil spring 281 in a longitudinal direction (the longitudinal direction of the spindle 267) in which the distance between the tapered surface 275a of the outer annular member 275 and the tapered surface 273a of the driving hub 273 is decreased in the radial direction. Thus, a predetermined pressing force is applied between the tapered surfaces 273a, 275a and the rollers 277 such that the tapered surfaces 273a, 275a and the rollers 277 come in frictional contact with each other. Further, the biasing force of the compression coil spring 281 is received by a thrust bearing 282 which is disposed between one axial end surface of the driving hub 273 and the inner housing 258.

As described above, the power transmitting mechanism 271 in the form of the planetary gear speed reducing mechanism according to this embodiment is assembled in advance such that, under unloaded conditions in which the driving motor 261 is not driven, a predetermined pressing force is constantly applied between the tapered surfaces 273a, 275a and the rollers 277 by the biasing force of the compression coil spring 281 so that the torque transmission is allowed by frictional force. Specifically, in the power transmitting mechanism 271 of the electric circular saw 250, preload is applied between the tapered surfaces 273a, 275a and the rollers 277 under unloaded conditions in which the driving motor 261 is not driven. The compression coil spring 281 forms a preloading member.

Therefore, when the driving hub 273 is rotationally driven, the rollers 277 held between the tapered surface 273a of the driving hub 273 and the tapered surface 275a of the outer annular member 275 are caused to revolve while rotating on the tapered surface 273a of the driving hub 273 by frictional force caused on the contact surfaces between the rollers 277 and the tapered surfaces 273a, 275a. As a result, the roller holding member 279 holding the rollers 277 is caused to rotate. Specifically, the torque of the driving hub 273 is transmitted to the roller holding member 279 via the rollers 277 and the roller holding member 279 is caused to rotate in the same direction as the direction of rotation of the driving hub 273 at reduced speed.

A small-diameter gear 283 is provided on the other end of the roller holding member 279 and rotates together with the roller holding member 279, and the small-diameter gear 283 is engaged with a large-diameter gear 285 which is fixed to the spindle 267 and has a larger diameter than the small-diameter gear 283. Therefore, the torque of the roller holding member 279 is transmitted from the small-diameter gear 283 to the spindle 267 via the large-diameter gear 285 at further reduced speed. Specifically, in this embodiment, speed reduction of the spindle 267 is made in two stages, via the rollers 277 between the driving hub 273 and the roller holding member 279, and via the small-diameter gear 283 and the large-diameter gear 285 between the roller holding member 279 and the spindle 267. Further, the spindle 267 is caused to rotate in a direction opposite to the direction of rotation of the driving motor 261.

Further, a cam plate 287 formed by a generally ring-like member is disposed between the outer annular member 275 and the inner housing 258 in the longitudinal direction of the spindle 267. As shown by a schematic illustration in FIG. 17, opposed surfaces of the cam plate 287 and the outer annular member 275 are formed by serrated can faces 289a, 289b which are engaged with each other. With such a construction, the outer annular member 275 is constantly prevented from moving (rotating) in the circumferential direction with respect to the inner housing 258 via the earn plate 287.

When the driving motor 261 is driven and the blade 263 is rotationally driven via the power transmitting mechanism 271, the outer annular member 275 held in frictional contact with the rollers 277 is acted upon by a drag force with which the outer annular member 275 tends to rotate by following rotation of the rollers 277. When the outer annular member 275 is moved in the circumferential direction with respect to the cam plate 287 by this drag force, serration peak regions of the cam face 289b of the outer annular member 275 climb onto serration peak regions of the cam face 289a of the cam plate 287. As a result, the movement of the outer annular member 275 in the circumferential direction is converted into movement in the longitudinal direction (the longitudinal direction of the spindle 267) in which the cam faces 289a, 289b are separated from each other. This movement of the outer annular member 275 in the longitudinal direction provides a force of pressing the tapered surface 275a of the outer annular member 275 against the rollers 277. Thus, in addition to a predetermined pressing force (preload) applied by the compression coil spring 281, another pressing force is applied between the rollers 277 and the tapered surfaces 273a, 275a. Specifically, under loaded conditions in which the driving motor 261 is driven, the force of pressing the tapered surface 275a against the rollers 277 is caused by movement of the outer annular member 275 in the longitudinal direction. This pressing force is a feature that corresponds to the "pressing force" according to the present invention. Further, the compression coil spring 281 is disposed outside the outer annular member 275, and one end of the compression coil spring 281 is held in contact with a flange 275b of the outer annular member 275 and the other end is held in contact with the cam plate 287.

The electric circular saw 250 according to this embodiment is constructed as described above. Therefore, when the driving motor 261 is driven and the driving hub 273 is rotationally driven, the rollers 277 are caused to revolve while rotating on the tapered surface 273a of the driving hub 273 by frictional force caused on the contact surfaces between the rollers 277 which are held between the tapered surface 273a of the driving hub 273 and the tapered surface 275a of the outer annular member 275, and the tapered surfaces 273a, 275a. Therefore, the roller holding member 279 holding the rollers 277 is rotated in the same direction as the direction of rotation of the driving hub 273 at reduced speed. The torque of the roller holding member 279 is transmitted from the small-diameter gear 283 to the blade 263 via the large-diameter gear 285 and the spindle 267 at further reduced speed. In this manner, the blade 263 is rotationally driven and thus the cutting operation can be performed on the workpiece by the blade 263.

According to this embodiment, the planetary member in the form of the rollers 277 is caused to rotate and revolve on the tapered surface 273a of the driving hub 273 by frictional force, so that the torque of the driving-side member in the form of the driving hub 273 is transmitted to the driven-side member in the form of the roller holding member 279. By using the gear speed reducing mechanism as a first gear speed reducing mechanism, particularly in the rotation part which rotates at high speed, backlash which is inevitable in a gear type speed reducing mechanism can be eliminated, so that noise which is caused when the power transmitting mechanism 271 is driven can be reduced.

Further, with the construction in which the pressing force in the longitudinal direction of the spindle 267 is applied between the rollers 277 and the tapered surfaces 273a, 275a by the compression coil spring 281, this pressing force can be amplified to a force in the radial direction transverse to the longitudinal direction by the wedging effect, so that higher frictional force can be obtained and the power transmitting performance can be enhanced.

When the blade 263 is rotationally driven, in addition to the biasing force of the compression coil spring 281, the cam plate 287 for preventing the outer annular member 275 from being dragged applies a force of pressing the rollers 277 to the outer annular member 275. Specifically, with the construction in which the pressing force is applied between the rollers 277 and the tapered surfaces 273a, 275a according to load (rotational resistance) caused in the power transmission path of the power transmitting mechanism 271, frictional force between the rollers 277 and the tapered surfaces 273a, 275a can be further increased and the power transmitting performance can be enhanced.

In this embodiment, speed reduction of the blade 263 is made in two stages, via the planetary gear speed reducing mechanism and via a gear speed reducing part including the small-diameter gear 283 and the large-diameter gear 285 between the driven-side member in the form of the roller holding member 279 and the tool bit in the form of the blade 263. Further, the blade 263 is caused to rotate in a direction opposite to the direction of rotation of the driving motor 261. With such a construction, a moment of inertia caused by rotation of the driving motor 261 and a moment of inertia caused by rotation of the blade 263 cancel each other out, so that recoil at the time of startup can be reduced.

By provision of the construction in which speed reduction is made in two stages, via the planetary gear speed reducing mechanism and the gear speed reducing part, the speed reduction ratio of the gear speed reducing part in the second stage can be made smaller so that the large-diameter gear 285 can be replaced with a small-diameter gear. As a result, the amount of protrusion of the blade 263 from the bottom of the base 251 can be increased and thus the maximum cutting depth of the blade 263 can be increased.

Further, in the above-described embodiments, the electric screwdriver 101 and the electric circular saw 250 are explained as representative examples of the power tool, but the present invention is not limited to them and may be applied to a screw tightening tool other than the electric screwdriver 101, a grinding/polishing tool for use in grinding/polishing operation, a drilling tool for use in drill operation, or other similar tools. As for the prime mover, not only an electric motor but also an air motor may be used.

Having regard to the above-described invention, following aspects are provided.

(1)

"The power tool as defined in claim 1, wherein:
the prime mover comprises a motor,
the power tool further comprises a gear speed reducing part that is provided between the driven-side member and the tool bit and receives torque of the driven-side member at reduced speed via the planetary member and transmits the torque to the tool bit at further reduced speed, and
the motor and the tool bit rotate in opposite directions."

DESCRIPTION OF NUMERALS 101 screwdriver (power tool)
103 body (power tool body)
105 motor housing
107 gear housing
107a stopper
109 handgrip
109a trigger
111 driving motor (prime mover)
113 motor shaft
115 pinion gear
116 leaf spring
117 spindle
117a bit insertion hole
117b small-diameter shaft 117c flange
117d spring receiving hole
117e rear end surface
118 ball
119 driver bit (tool bit)
119a small-diameter portion
121 bearing
123 locator
131 power transmitting mechanism
133 fixed hub
134 bearing
135 driving gear (driving-side member)
135a barrel part
135b teeth
135c bottom wall
137 roller (intervening member)
138 retainer ring
139 roller holding member
139a barrel part
141 bearing
143 bearing
145 roller installation groove
146 tapered surface of a fixed hub
147 tapered surface of a driving gear
149 compression coil spring
153 fixed hub
153a tapered surface
154 needle pin
155 driving gear (driving-side member)
155a teeth
155b inner circumferential surface
157 ball (intervening member)
158 compression coil spring
159 ball holding member (driven-side member)
159a cylindrical body
161 fixed hub
162 bearing
163 driving gear (driving-side member)
164 cylindrical portion
164a tapered surface
165 driven-side cylindrical portion (driven-side member)
165a tapered surface
166 thrust bearing
167 roller (intervening member)
168 compression coil spring
169 roller holding member
169a boss part
169b barrel part
169c roller installation groove
250 electric circular saw (power tool)
251 base
251a opening
253 circular saw body (power tool body)
255 motor housing
256 safety cover
257 blade case
258 inner housing
259 handgrip
261 driving motor
262 motor shaft
263 blade (tool bit)
264, 265 bearing
267 spindle
271 power transmitting mechanism (planetary gear speed reducing mechanism)
273 driving hub (driving-side member)
273a tapered surface
275 outer annular member
275a tapered surface
275b flange
277 roller (intervening member)
279 roller holding member (driven-side member)
279a roller installation groove
281 compression coil spring
282 thrust bearing
283 small-diameter gear
285 large-diameter gear
287 cam plate
289a, 289b cam face

What we claim is:

1. A power tool comprising:
a prime mover that is capable of driving a tool bit, and
a planetary gear speed reducing mechanism that transmits torque of the prime mover, wherein:
the planetary gear speed reducing mechanism includes a driving member which is rotationally driven by the prime mover, a driven member which is rotatably and coaxially disposed with the driving member and to which the tool bit is capable of being coupled, and an intervening member that is disposed between the driving member and the driven member,
the intervening member has a contact surface in contact with the driving member and the intervening member is configured as a planetary member and at least caused to rotate by frictional force acting on the contact surface in contact with the driving member when the driving member is rotationally driven, so that torque of the driving member is transmitted to the driven member at reduced speed,
a tapered surface of at least one of the driving member or the driven member is inclined with respect to a rotation axis of the driving member, the intervening member is held in frictional contact with the tapered surface, and a pressing force is applied between the intervening member and the tapered surface under loaded conditions,
under unloaded conditions, a predetermined preload is constantly applied between the intervening member and the tapered surface, and
when the driving member and the driven member are rotationally driven, in addition to the predetermined preload, a pressing force is further applied between the intervening member and the tapered surface.

2. The power tool as defined in claim 1, wherein the planetary gear speed reducing mechanism has a carrier for holding the intervening member, and the driven member comprises the carrier and receives torque from the intervening member.

3. The power tool as defined in claim 1, wherein:
the prime mover comprises a motor,
the power tool further comprises a gear speed reducing part that receives torque of the driven member at reduced speed via the planetary member and is capable of transmitting the torque to the tool bit at further reduced speed, and
the motor is capable of rotating in a direction opposite to the tool bit.

4. The power tool as defined in claim 1, wherein:
an annular member is coaxially disposed with the driving member, movable in a direction of the rotation axis of the driving member and contactable to the intervening member, a pressing member applies a predetermined pressing force to the annular member for the predetermined preload between the intervening member and the tapered surface, a housing houses the planetary gear speed reducing mechanism, a cam member is disposed between the annular member and the housing, and the cam member applies the pressing force between the intervening member and the tapered surface when the annular member is rotated around the rotation axis of the driving member under loaded conditions, and the annular member is moved in the direction of the rotation axis of the driving member.

* * * * *